(12) United States Patent
Tachi et al.

(10) Patent No.: US 6,836,286 B1
(45) Date of Patent: Dec. 28, 2004

(54) METHOD AND APPARATUS FOR PRODUCING IMAGES IN A VIRTUAL SPACE, AND IMAGE PICKUP SYSTEM FOR USE THEREIN

(75) Inventors: Susumu Tachi, 2-31-14, Umezono, Tsukuba-Shi, Ibaraki-Ken, 305-0045 (JP); Taro Maeda, Tokyo-To (JP); Yutaka Kunita, Yokohama (JP); Masahiko Inami, Tokyo-To (JP)

(73) Assignees: Minolta Co., Ltd., Osaka (JP); Susumu Tachi, Ibaraki-Ken (JP)

( * ) Notice: Subject to any disclaimer, the term of this patent is extended or adjusted under 35 U.S.C. 154(b) by 1133 days.

(21) Appl. No.: 09/083,174

(22) Filed: May 22, 1998

(30) Foreign Application Priority Data

May 23, 1997 (JP) ............................................. 9-133160

(51) Int. Cl.[7] ................................................ H04N 7/00
(52) U.S. Cl. ....................................................... 348/36
(58) Field of Search ............................... 348/36–38, 39, 348/42, 43, 46, 47, 48; H04N 7/00

(56) References Cited

U.S. PATENT DOCUMENTS

| | | | | |
|---|---|---|---|---|
| 4,400,724 A | * | 8/1983 | Fields .......................... | 348/15 |
| 4,760,443 A | * | 7/1988 | Secka .......................... | 348/37 |
| 5,625,408 A | * | 4/1997 | Matsugu et al. .............. | 348/42 |
| 5,650,813 A | * | 7/1997 | Gilblom et al. ............... | 348/36 |
| 5,696,837 A | * | 12/1997 | Green ......................... | 382/128 |

OTHER PUBLICATIONS

Shinsuke Suzuki et al, "Design of Visual Display for Augmented Reality—Fusion of Real and Virtual Space Image Using Depth from Viewpoint—", Proceedings of the 35th SICE Annual Conference, Domestic Session Papers vol. I, 107 D–2, (Jul.24–26, 1996) with an Engligh translation thereof.

Matthias M. Wloka et al, "Resolving Occlusion in Augmented Reality", Proceedings of 1995 Symposium on Interactive 3D Graphics, pp. 5–12, (1995).

* cited by examiner

Primary Examiner—Tung T. Vo
(74) Attorney, Agent, or Firm—Sidley Austin Brown & Wood LLP

(57) ABSTRACT

According to the method and apparatus, light beams directed toward virtual visual points are detected from among light beams emitted from or reflected on the surface of an object. The detection is effected by an image pickup device in a plurality of positions lying on a virtual closed surface with which the object is enclosed. The detected light beams are converted into image pickup signals, which are delivered to a display device adapted to display an image toward a visual point of an observer standing or sitting in a place different from a place where any of the virtual visual points is disposed. The image is displayed in such a manner as if light beams were emitted toward the visual point of the observer from various points on the surface of a virtual object disposed in a virtual position corresponding to the relative positions of the real object and any of the virtual visual points. The invention is particularly adapted for enabling persons present in different localities to feel as if they met together in a room.

14 Claims, 23 Drawing Sheets

1 Video conference system

1 Video conference system

VS1 Virtual space

2 Three-dimensional interactive TV

METHOD AND APPARATUS FOR PRODUCING IMAGES IN A VIRTUAL SPACE, AND IMAGE PICKUP SYSTEM FOR USE THEREIN

BACKGROUND OF THE INVENTION

This application is based on Japanese Patent Application No. 09-133160 filed on May 23, 1997, the contents of which is incorporated herein by reference.

1. Field of the Invention

This invention relates to a method of and an apparatus for producing images in a virtual space, and to an image pickup system suitable for use therein.

2. Description of the Prior Art

In order to form a three-dimensional image by a computer, it has been conventional practice in the past to resort to geometry based rendering (GBR) or image based rendering (IBR).

The GBR is a comparatively long-established method, whereby the sharply defined shape and position of an object are obtained such that one object is allowed to collide with or hide itself behind another under conditions closely approximating actual conditions. On the other hand, GBR is not suitable for use in illustrating an object in complicated shape, because the three-dimensional shape obtained from GBR is a combination of fundamental figures. It is difficult, therefore, to form an image true to nature to the extent of looking as if it were a photograph.

The IBR is a method of providing, on the basis of a plurality of two-dimensional images, what an object looks like when it is viewed from various visual points. In recent years, notable progress has been made in this field. Although the shape and position of the object are not sharply defined, it is comparatively easy to form an image true to nature to the extent of looking as if it were a photograph.

Heretofore, video conference systems have been utilized to enable persons present in different localities to hold a conference. A video conference system comprises video cameras and display apparatuses provided in rooms located in different localities. These video cameras and display apparatuses are connected to each other by means of telecommunication lines. The personal appearance of attendance is photographed by means of the video cameras provided in the respective rooms. Image pickup signals are directed toward the other end of each telecommunication line and displayed on the screen of the display apparatus provided in the room involved.

The prior art video conference system has the disadvantage that it does not allow a speaker to behave as he or she pleases. More specifically stated, the speaker has to face the display apparatus which is fixedly held in position and has only a limited screen area; the visual axes of the speaker's eyes are bound to the video camera disposed in the immediate vicinity of the display apparatus; and the speaker is so conscious of the video camera that he cannot feel as if he were in the same room with the listeners present at the other end of the telecommunication line.

Two video cameras disposed in spaced relation with each other in each room and a display apparatus provided with a lenticular screen in each room may be regarded as suitable for allowing the speaker to have a stereoscopic vision of the listeners and allowing the listeners to have a stereoscopic vision of the speaker. Even in this case, however, it is very difficult to allow them to have a stereoscopic vision irrespective of their visual points.

SUMMARY OF THE INVENTION

The present invention is concerned with eliminating these various difficulties. As such, the primary object of the invention is to provide a method of and an apparatus for producing images in a virtual space and an image pickup system suitable for use therein so as to enable persons present in different localities to feel as if they met together in a room.

In accordance with the invention, light beams directed toward virtual visual points are detected from among light beams emitted from or reflected on the surface of an object. The detection is effected by an image pickup device in a plurality of positions lying on a virtual closed surface with which the object is enclosed. The detected light beams are converted into image pickup signals, which are delivered to a display device adapted to display an image toward a visual point of an observer standing or sitting in a place different from a place where any of the virtual visual points is disposed. The image is displayed in such a manner as if light beams were emitted toward the visual point of the observer from various points on the surface of a virtual object disposed in a virtual position corresponding to the relative positions of the real object and any of the virtual visual points.

An image pickup device such as shown in FIG. 7 may be used in the apparatus of this invention. This image pickup device comprises an upright CCD line sensor CL and a cylindrical housing or jacket disposed circumferentially around the CCD line sensor CL and provided with a slit aperture STm extending longitudinally along a generatrix. The image pickup device rotates on its own axis while being advanced along a circular path of travel.

This image pickup device records light beams received from directions determined by positions in which the image pickup device is located along the circular path of travel. An image formed by light beams received in a specific position and from a specific direction is hereinafter referred to as a "linear image".

Instead of the CCD line sensor CL, it is also possible to use a CCD area sensor CE incorporated in a camera CM as shown in FIG. 16. Vertical scan is associated with auxiliary scanning effected in a horizontal direction. Vertical scan makes it possible to obtain a large number of scanning lines. An image formed by one of them specified by a position and a direction is also hereinafter referred to as a "linear image".

In order to afford to an observer an overall view of the object field, necessary linear images specified by positions and directions are selected from among all the linear images and delivered to the display device for image reconstruction.

A display device such as shown in FIG. 3 may be used in the apparatus of this invention. This display device comprises full-color LED matrixes EX adapted to be advanced along a circular path of travel. On the basis of the aforesaid linear images, images for the left and right eyes respectively of an observer are afforded to him or her. If the display device has an inner cylindrical surface covered all over with the LED matrixes EX, it need not be of a revolving type.

DESCRIPTION OF THE PREFERRED EMBODIMENTS

Figure 1:
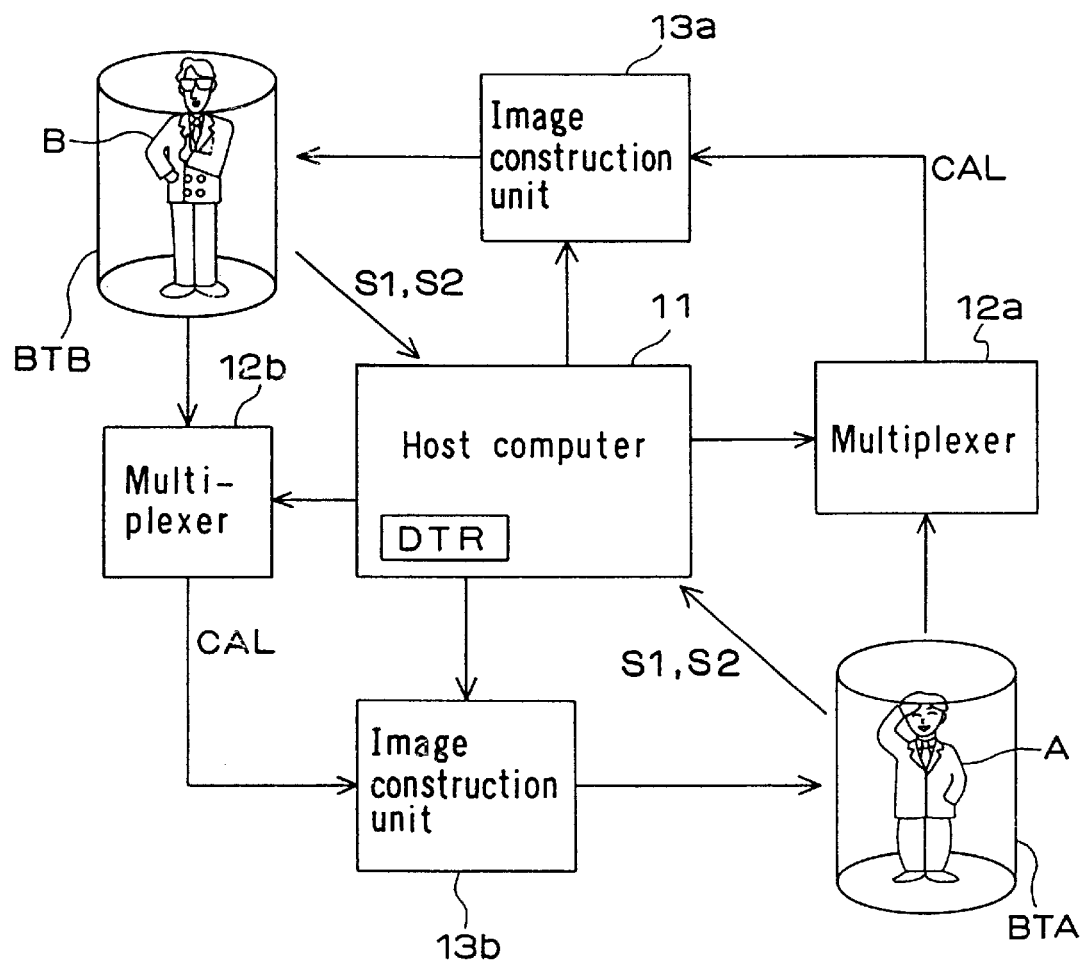
FIG. 1 is a block diagrammatic representation of a video conference system which is the first embodiment of the invention.
Figure 2:
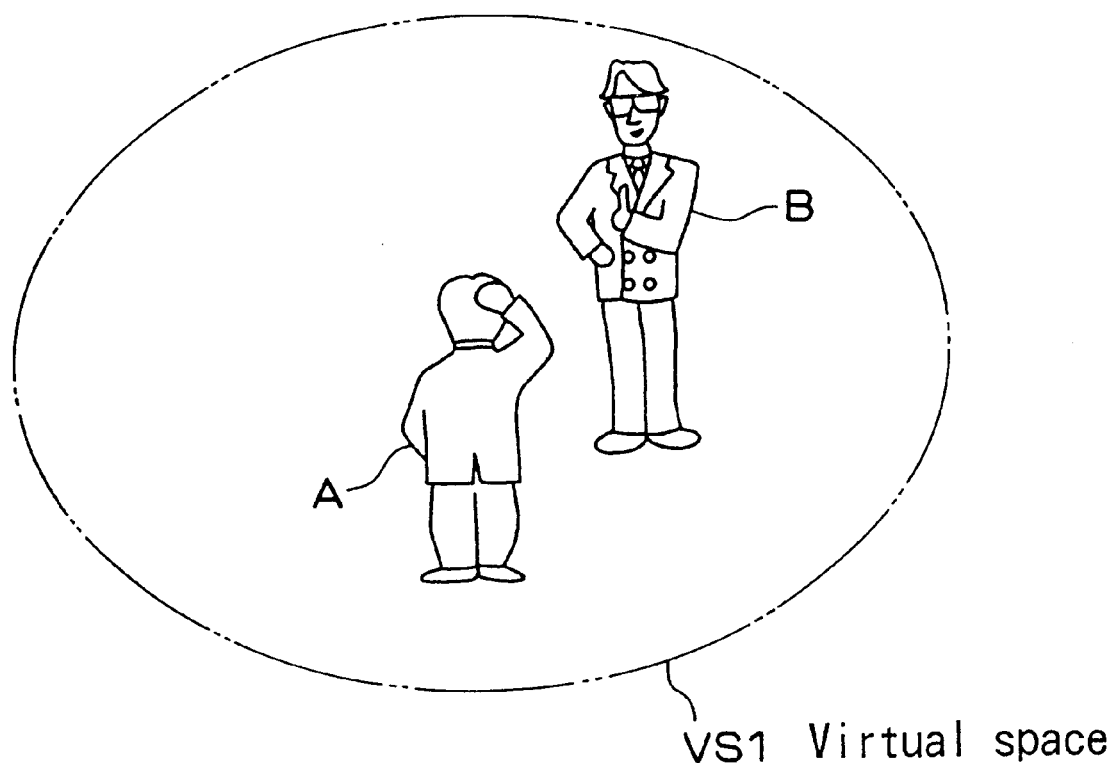
FIG. 2 is a view showing a general state of a virtual space in which persons present in different localities are holding a conference.

Referring now to FIG. 1, a video conference system 1 embodying this invention includes two cylindrical booths BTA and BTB disposed in different localities and assigned to two persons A and B respectively. The video conference system 1 is capable of producing images in a virtual space VS1 as shown in FIG. 2 so as to enable the persons A and B to feel as if they met together in a room.

It will of course be apparent to those skilled in the art that the video conference system 1 may include three or more cylindrical booths so as to allow three or more persons to attend a video conference.

Figure 3:
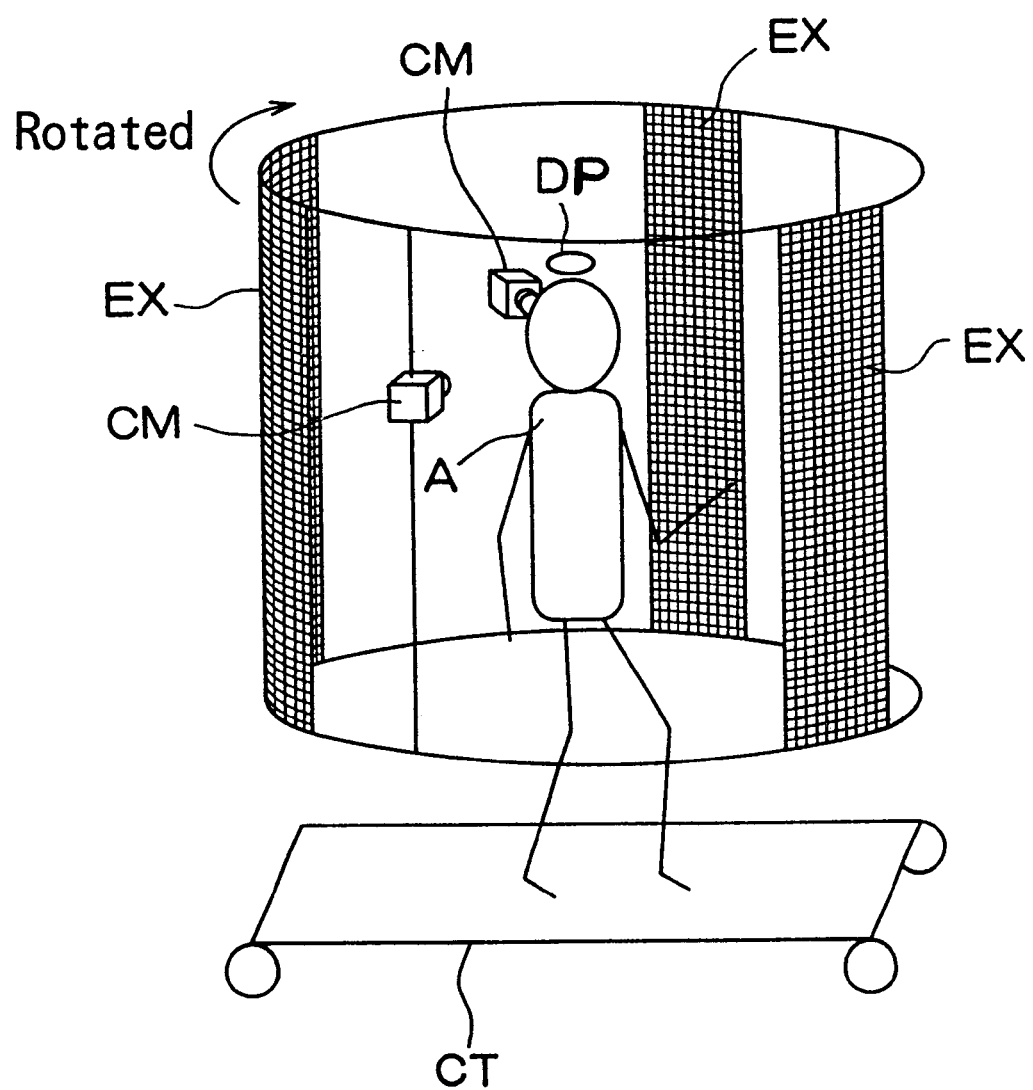
FIG. 3 is a view showing the component parts of a booth for use in the conference.

Referring now to FIG. 3, the cylindrical booth BTA comprises a plurality of cameras CM, a plurality of full-color LED matrixes EX, and a driving device (not shown) such as a motor connected thereto through a gear reduction transmission for rotating the cylindrical booth BTA around the person A at a predetermined speed.

The cylindrical booth BTA is formed to include both a display device and an image pickup device such that the cameras CM rotate in a circle around the person A and the revolving LED matrixes EX afford to the person A an overall view of the object field.

A head position detector DP mounted on the head of the person A transmits a signal S1 in accordance with the position and posture of the person A. On the basis of the signal S1, the positions of both eyes of the person A in the cylindrical booth BTA, i.e. the positions of the visual points of both of his or her eyes in the cylindrical booth BTA, are measured. In addition to the signal S1, a signal S2 which will appear hereinafter is also taken into account when the positions of the visual points of both of both of his or her eyes in the cylindrical booth BTA have to be measured while he or she is viewing another cylindrical booth or booths.

By virtue of slit apertures provided in the inner surface of each LED matrix EX, light beams emitted from each LED matrix EX are made highly directional. Images with a parallax imparted thereto are afforded to the respective positions of the visual points of both eyes. Consequently, the person A in the cylindrical booth BTA is allowed to have a stereoscopic vision without putting on a head-mounted display (HMD). Thus the facial expression of the person A is prevented from being hidden behind the HMD. This is of prime importance, because the vital point of a video conference resides in the fact that the attendees can look at each other.

The LED matrixes EX display a specific color at the moment when the person A is photographed by the cameras CM.

In the subsequent stage of data processing, this color allows an image of the person A alone to be easily retrieved.

An omnidirectional treadmill CT provided on the floor below the cylindrical booth BTA allows the person A to make a gesture of walking, in accordance with which the treadmill CT moves so as to countervail the actual movement of the person A and outputs a signal S2 indicating the distance by which the person A would move and the direction in which the person A would move if it were not for the treadmill CT. Instead of the treadmill CT, it is also possible to provide a control stick to be manipulated by the person A.

The cylindrical booth BTB (FIG. 1) has an identical construction with the cylindrical booth BTA.

Referring again to FIG. 1, the video conference system 1 further comprises a host computer 11 for receiving the signals S1 and S2 from the head position detectors DP and the treadmills CT respectively and monitoring the positions of the persons A and B in the virtual space VS1 (FIG. 2), multiplexers 12a and 12b for selecting linear images (i.e. scanning lines) CAL picked up by the cameras CM, and image construction units 13a and 13b for providing final images by displaying the linear images CAL on the LED matrixes EX.

The host computer 11 stores information DTR on the relative positions of the persons A and B in the virtual space VS1. The information DTR is updated every time the virtual movement of the persons A and/or B in the virtual space VS1 is caused by the treadmill CT or the control stick.

In the multiplexers 12a and 12b, linear images CAL needed by the persons B and A respectively are selected on the basis of the information DTR on the positions of the persons A and B, especially on the virtual visual points. Since only the selected linear images CAL are delivered to the image construction units 13a and 13b, a substantial decrease in the amount of information to be transmitted to the image construction units 13a and 13b is obtained.

In order to provide final images, the linear images CAL are subjected to expansion, contraction and/or permutation in the image construction units 13a and 13b on the basis of the information DTR on the positions of the persons A and B and on the basis of information on the positions of slit apertures provided in the inner surface of each LED matrix EX and on the directions in which the light beams are emitted through the slit apertures. Whether the linear images CAL should be expanded or contracted depends on the position of the person A or B relative to a camera CM and the virtual visual point. The linear images CAL are expanded when the virtual visual point is disposed closer to the person A or B than the camera CM, and contracted when the virtual visual point is disposed farther therefrom. The virtual visual point will be hereinafter more fully described.

The multiplexers 12a, 12b and the image construction units 13a, 13b are disposed in the immediate vicinity of the cylindrical booths BTA and BTB respectively. Two signal processing systems performing the function of the host computer 11 are either disposed in the immediate vicinity of one of the cylindrical booths BTA and BTB or disposed one at each cylindrical booth. These two signal processing systems give information to each other via telecommunication lines and transmit image pickup signals to the display means at real-time rates. A computer vision technique together with suitable hardware or software is used for the multiplexers 12a, 12b and the image construction units 13a, 13b as will be explained more fully herein.

In, order to bring about a cordial understanding between the attendees at a video conference, it has been found extremely desirable that the images afforded to each other should be true to nature to the extent of looking as if they were photographs. For this reason, images to be displayed on the LED matrixes EX are not formed by GBR but formed by IBR.

Further requirements to be satisfied by a video conference system are that the images afforded to the persons A and B should be dynamic and that these images should be afforded in real time.

The prior art IBR is useful for the recording and reproduction of scenery or still life. In carrying out a concept of the prior art IBR, a point which lies in one image and corresponds to a point lying in another image is specified by an operator. However, this concept is not suitable for use in the video conference system 1, because it is based on a drastically different design philosophy from the one on which this invention is based.

An alternative manner, in which the aforesaid point need not be specified by an operator, has also been previously proposed in Shinji Uchiyama et al., "Building a Cyber-Space by Mixing Real Data Based on Ray-Space Theory with Computer Graphics Models," 3D *Image Conference* '96, 1–3, pp. 13–18 (1996), wherein a real image is encoded into ray-space data and recorded, the ray-space data being subsequently decoded into the real image. Consequently, the aforesaid requirement that the images be afforded in real time is not satisfied.

The video conference system 1 embodying this invention satisfies all of the aforesaid requirements.

Reference will now be specifically made to a geometrical aspect of the principle on which the invention is based. The following description is premised on an assumption that light beams always pass through a single medium having a constant refractive index.

Figure 4:
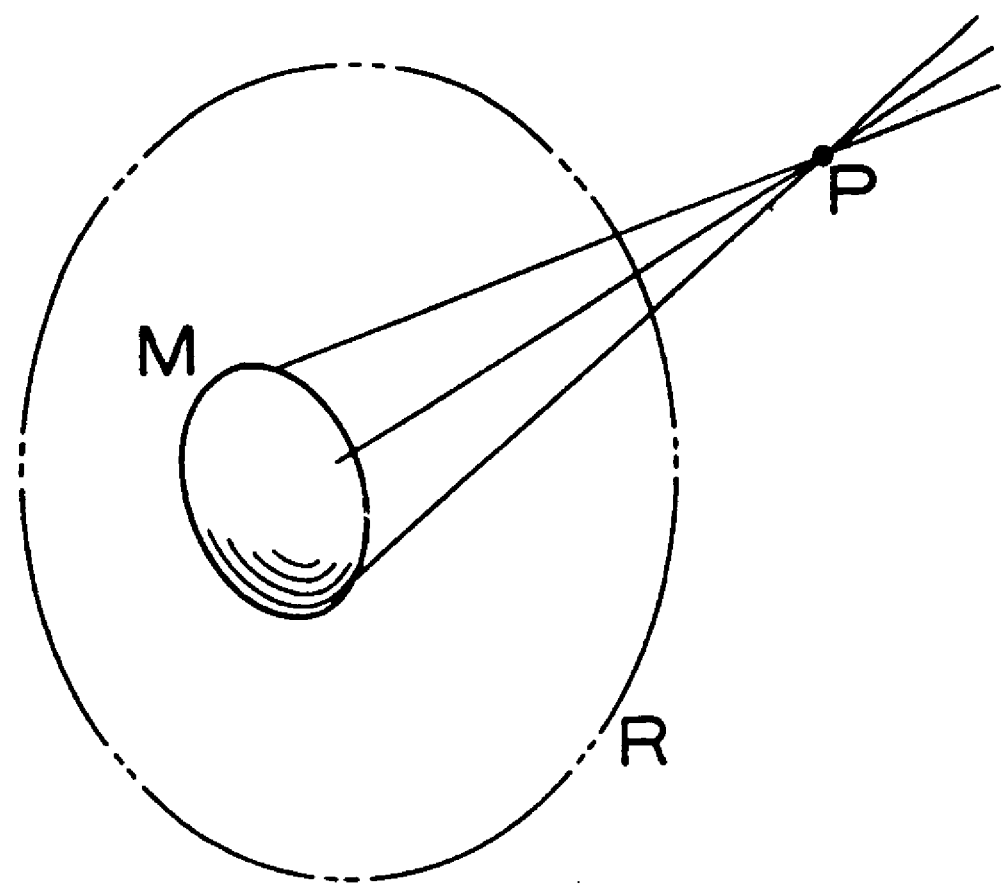
FIG. 4 is a view useful in understanding a basic principle of image reconstruction.

Let it be assumed that light beams are emitted from, or reflected on the surface of, an object M shown in FIG. 4 and intersect at a point such as P, that these light beams cannot be directly recorded at the point P, and that the object M is enclosed with a virtual spherical surface R through which the aforesaid light beams have to pass in order to reach the point P.

Then, recording the light beams on the virtual spherical surface R will make it possible to reconstruct the light beams intersecting at the point P.

On the other hand, the point P regarded as a center of projection in perspective transformation provides what the object M looks like when it is viewed from the point P.

In order to facilitate the efficient use of the foregoing concept, the same will now be considered from the point of view of plane geometry.

Figure 5:
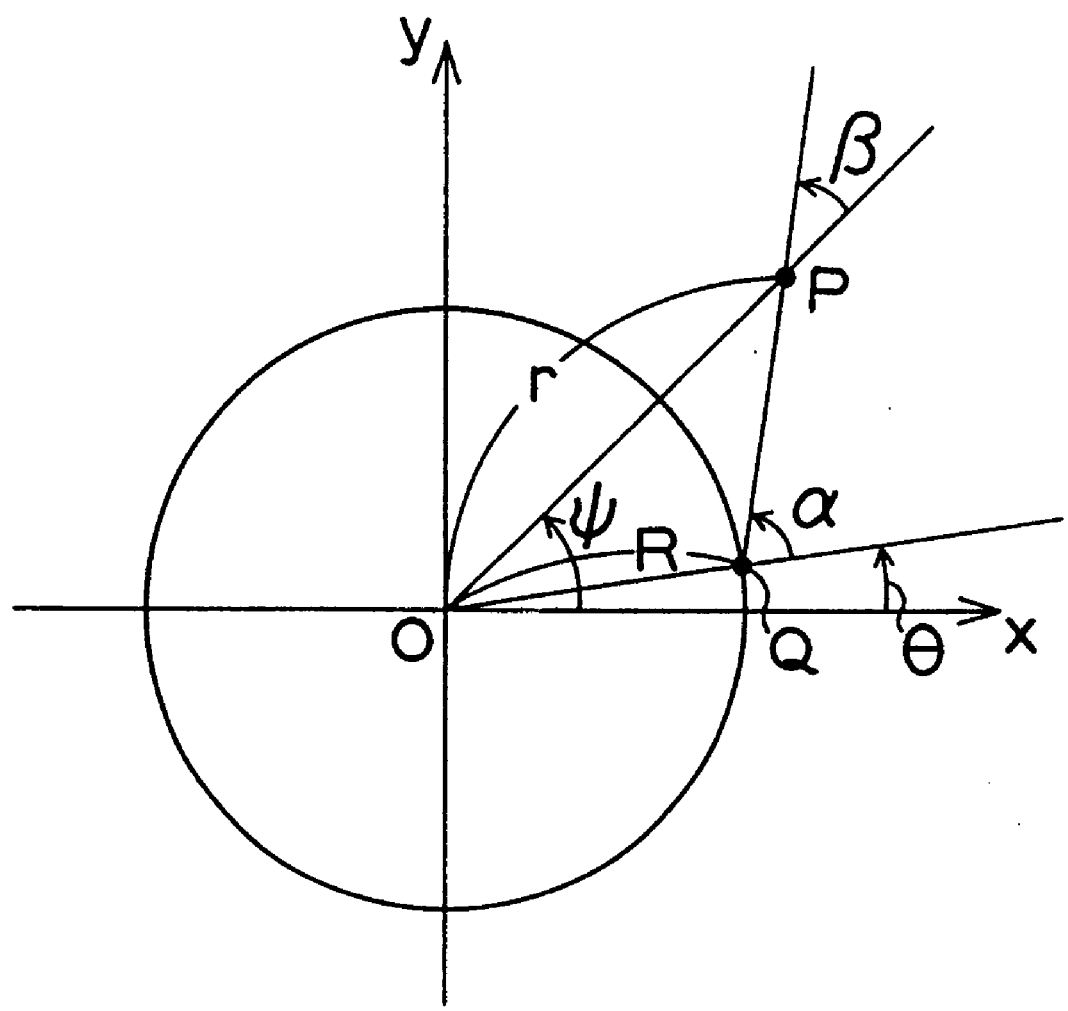
FIGS. 5 and 6 are views useful in understanding a geometrical aspect of the principle.
Figure 6:
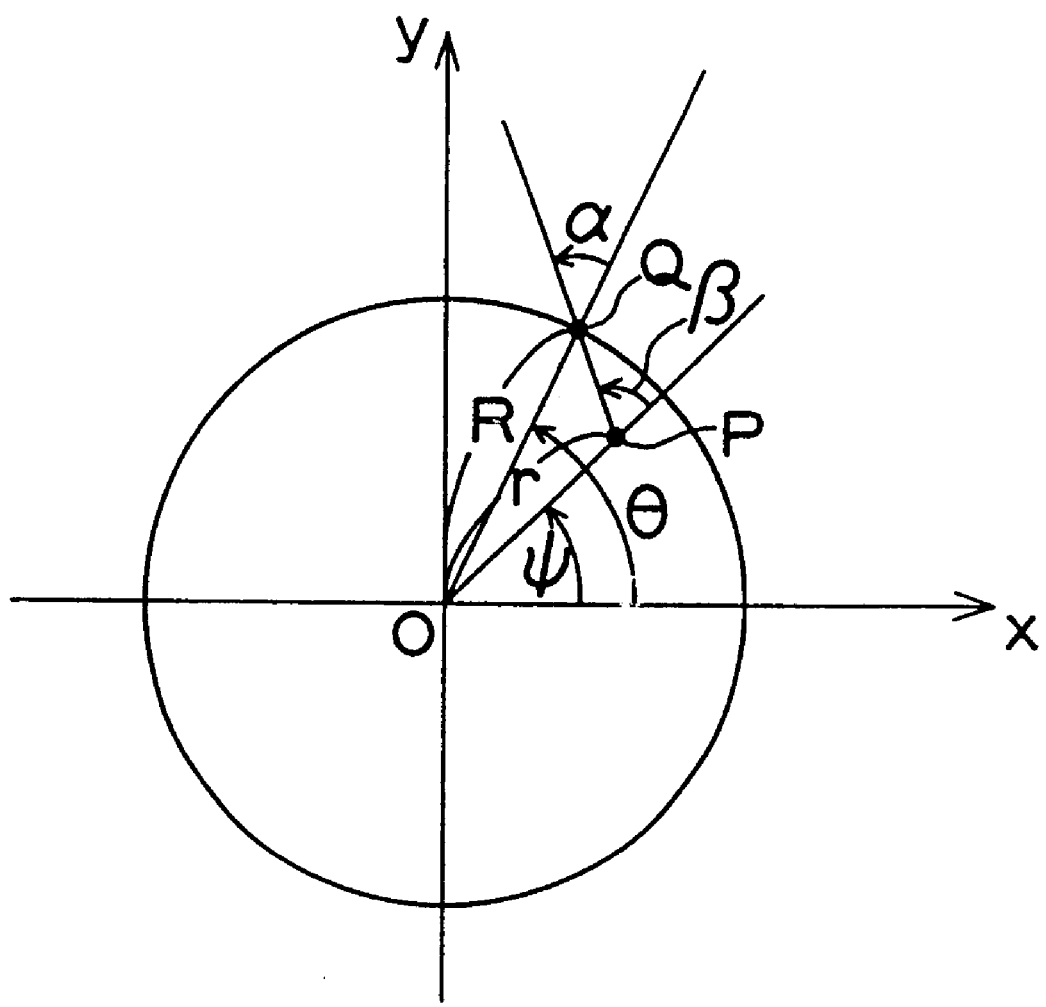

In FIGS. 5 and 6, the aforesaid object M is represented by the origin 0 of an orthogonal coordinate system, and the virtual spherical surface R is represented by a circle with a radius of R and with a center lying on the origin 0. In FIG. 5, the point P is disposed outwardly of the circle. In FIG. 6, it is disposed within the circle.

Let it be assumed that a light beam emitted from, or reflected on the surface of, the origin 0 and reaching the point P has to pass through the circle at a point Q. The point P can be specified by its rectangular Cartesian coordinates ($\gamma \cos \psi, \gamma \sin \psi$), in which $\gamma$ is the distance OP and $\psi$ is the angle that the line OP makes with the X axis. The point Q can be specified by its rectangular Cartesian coordinates (R $\cos \theta$, R $\sin \theta$), in which $\theta$ is the angle that the line OQ makes with the X axis. Assuming that the line QP makes angles $\alpha$ and $\beta$ with the lines OQ and OP respectively, it follows that $$\alpha+\theta+\beta+\psi=\gamma \qquad (1)$$

where $\gamma$ is a constant.

When $\gamma \neq \pi/2+n\pi$ for any integer n, $$(\gamma \sin \psi - R \sin \theta)/(\gamma \cos \psi - R \cos \theta) \tan \gamma \qquad (2)$$

When $\gamma=\pi/2+n\pi$ for any integer n, $$\gamma \cos \psi - R \cos \theta = 0 \qquad (3)$$

It will be understood that the point P satisfies equations (1) to (3) irrespective as to whether it is disposed outwardly of the circle or within the circle, that the object M shown in FIG. 4 corresponds to each of the persons A and B shown in FIG. 1, and that the virtual spherical surface R corresponds to each of the cylindrical booths BTA and BTB.

Figure 7:
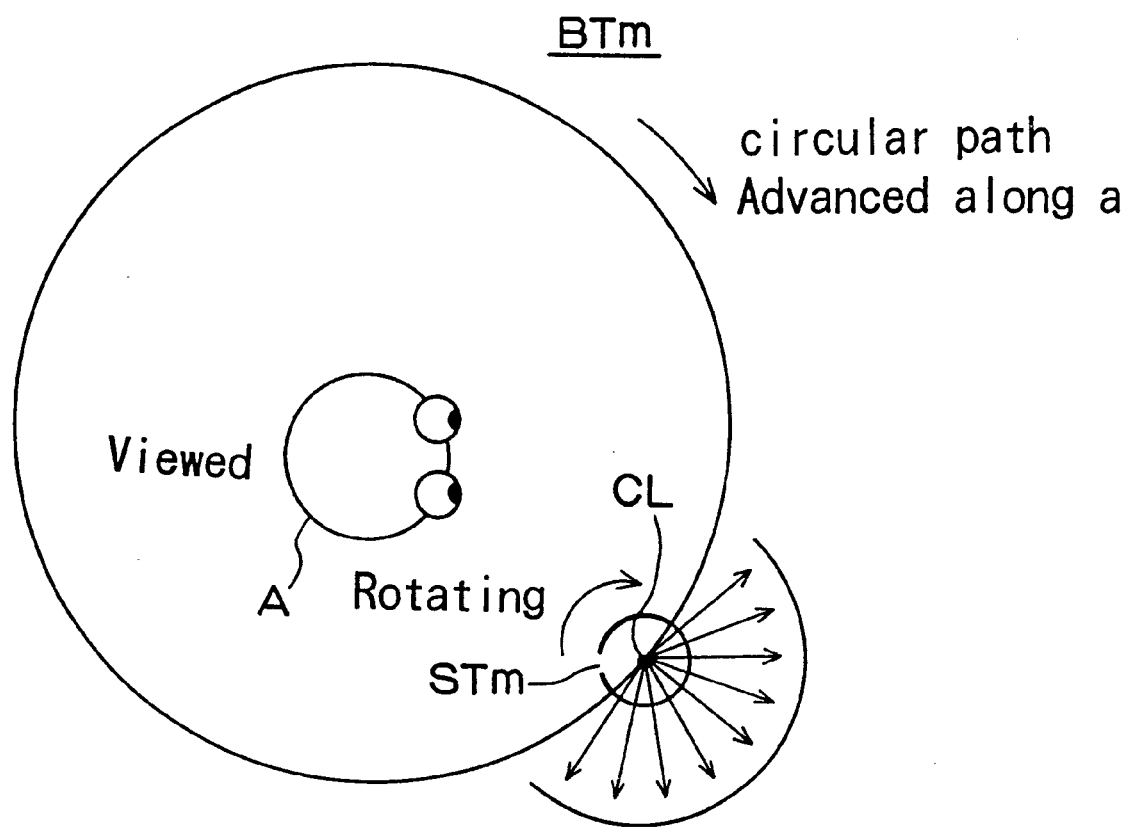
FIG. 7 is a view showing the image pickup device as being operated.

FIG. 7 shows a modified form of a cylindrical booth. The cylindrical booth BTm shown in FIG. 7 is generally similar to the cylindrical booth BTA shown in FIG. 3 except that image pickup devices provided on the former differ from the cameras CM provided on the latter. In referring to FIG. 7, it will be noted that only one of the image pickup devices is illustrated. The others of the image pickup devices have been omitted for simplicity.

The image pickup device shown in FIG. 7 comprises an upright CCD line sensor CL and a cylindrical housing or jacket disposed circumferentially around the CCD line sensor CL and provided with a slit aperture STm extending longitudinally along a generatrix. The image pickup device rotates on its own axis while being advanced along a circular path of travel.

This image pickup device records light beams received from directions determined by positions in which the image pickup device is located along the circular path of travel. Light beams received in a specific position and from a specific direction correspond to a vertically extending scanning line.

The cylindrical booth BTm is hereinafter referred to as a "satellitic mechanism", by which all the light beams traveling therein are picked up as scanning lines.

Figure 8:
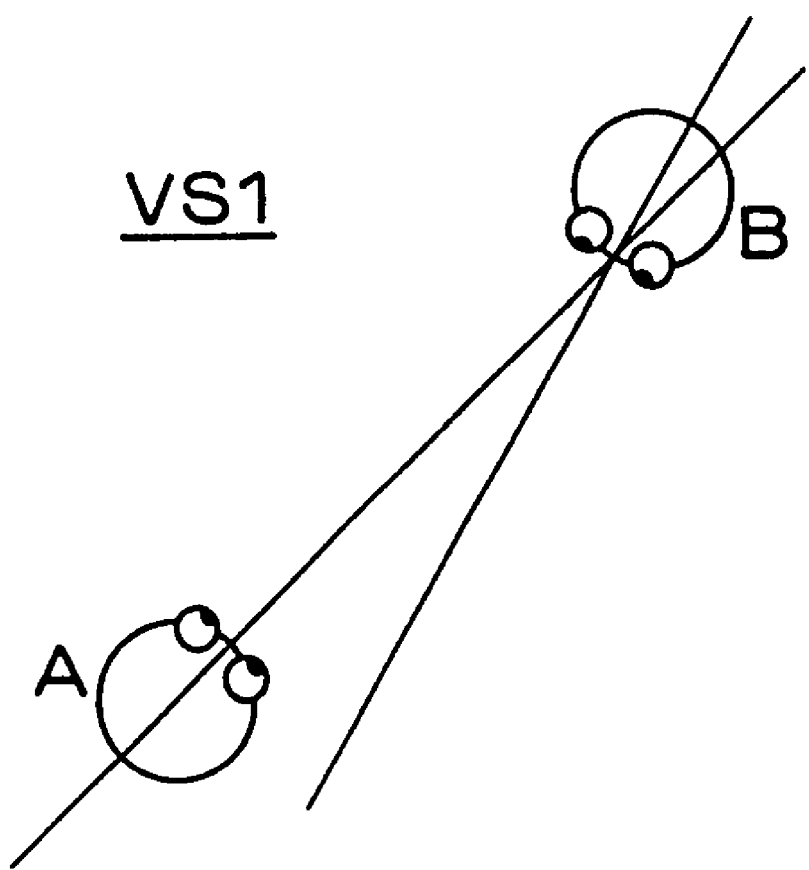
FIG. 8 is a view showing the relative positions of persons in the virtual space.
Figure 9A:
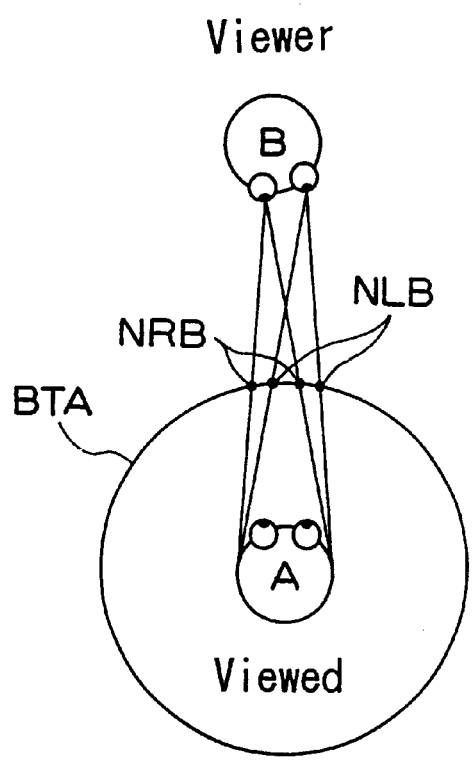
FIGS. 9A and 9B are views to help explain how the scanning lines are selected at the time of image pickup.
Figure 9B:
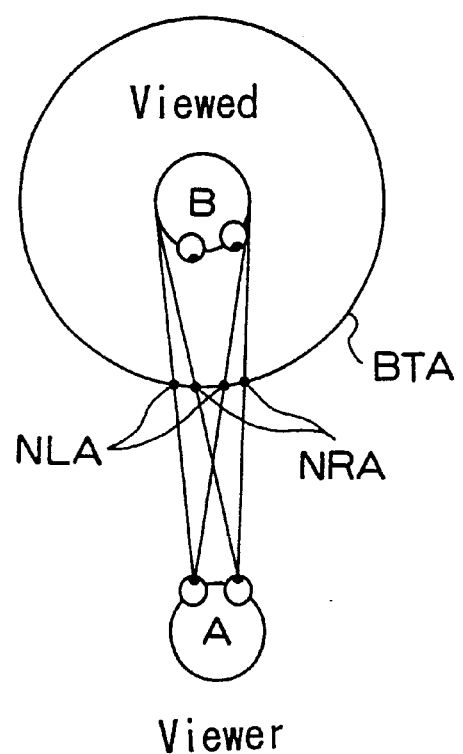

The manner in which scanning lines needed for providing final images are selected from among all the scanning lines recorded by the satellitic mechanism will be most clearly understood upon a review of FIGS. 8, 9A, and 9B.

Since each light beam is received by the satellitic mechanism in a specific position and from a specific direction, each scanning line needed for providing final images can be specified by a position and a direction, which in turn are determined by the relative positions of the persons A and B in the virtual space VS1.

FIG. 9A is a diagram for the principle of selection of scanning lines specified by positions and directions under the condition that the person A is exposing him- or herself to the person B and that these two persons are in relative positions as shown in FIG. 8.

In order to allow the person B to have a stereoscopic vision of the person A, scanning lines for the left and right eyes respectively of the person B have to be selected. Scanning lines for the left eye of the person B should be disposed between two points NLB in order to allow that eye to cover the exposed face of the person A. Scanning lines for the right eye of the person B should be disposed between two points NRB in order to allow that eye to cover the exposed face of the person A. These requirements will be fulfilled by properly selecting the values of $\alpha$ and $\theta$ for equations (1) to (3), i.e., by properly selecting the position of the point Q (FIG. 5) with either of the left and right eyes of the person B regarded as the point P.

FIG. 9B is a diagram for the principle of selection of scanning lines specified by positions and directions under the condition that the person B is exposing him- or herself to the person A and that these two persons are in relative positions as shown in FIG. 8.

Scanning lines for the left eye of the person A should be disposed between two points NLA in order to allow that eye to cover the exposed face of the person B. Scanning lines for the right eye of the person A should be disposed between two points NRA in order to allow that eye to cover the exposed face of the person B. These requirements will be fulfilled by properly selecting the values of $\alpha$ and $\theta$ for equations (1) to (3), i.e., by properly selecting the position of the point Q with either of the left and right eyes of the person A regarded as the point P.

Figure 10:
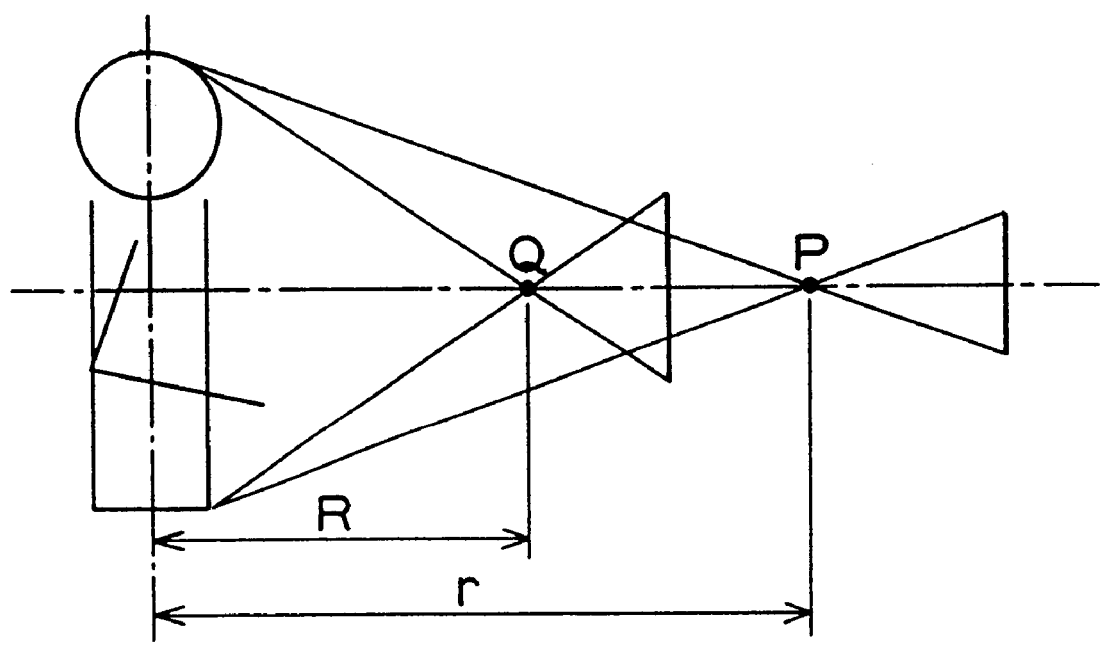
FIG. 10 is a view useful in understanding the expansion and contraction of scanning lines.

The manner in which the scanning lines are expanded or contracted will now be described with reference to FIG. 10.

At the virtual visual point P, virtual scanning lines are obtained from scaling to which the scanning lines obtained at the image pickup point Q are subjected. The size of the virtual scanning lines is determined by R/r. In order to prevent them from being distorted in the vertical direction, the person who is exposing him- or herself to the image pickup point Q should closely approximate to a right cylinder having an axis passing through the XY plane (FIG. 5) either at the origin O or in the immediate vicinity thereof.

Actually, the person who is exposing him- or herself to the image pickup point Q may be looked upon as an object approximating to a right cylinder. He or she is viewed by an observer whose eyes are disposed in horizontally spaced relation to each other. Furthermore, a horizontal parallax is imparted to the images to be afforded to both eyes of the observer. Consequently, the observer scarcely recognizes that the images are distorted in the vertical direction.

The manner in which the scanning lines are reconstructed will now be described with reference to FIG. 11.

In view of the fact that the attendees at a video conference are not only to be viewed by others but also to view others, it is apparent that the function to be performed by the aforesaid satellitic mechanism is not only to pick up images but also to display the same.

Figure 11:
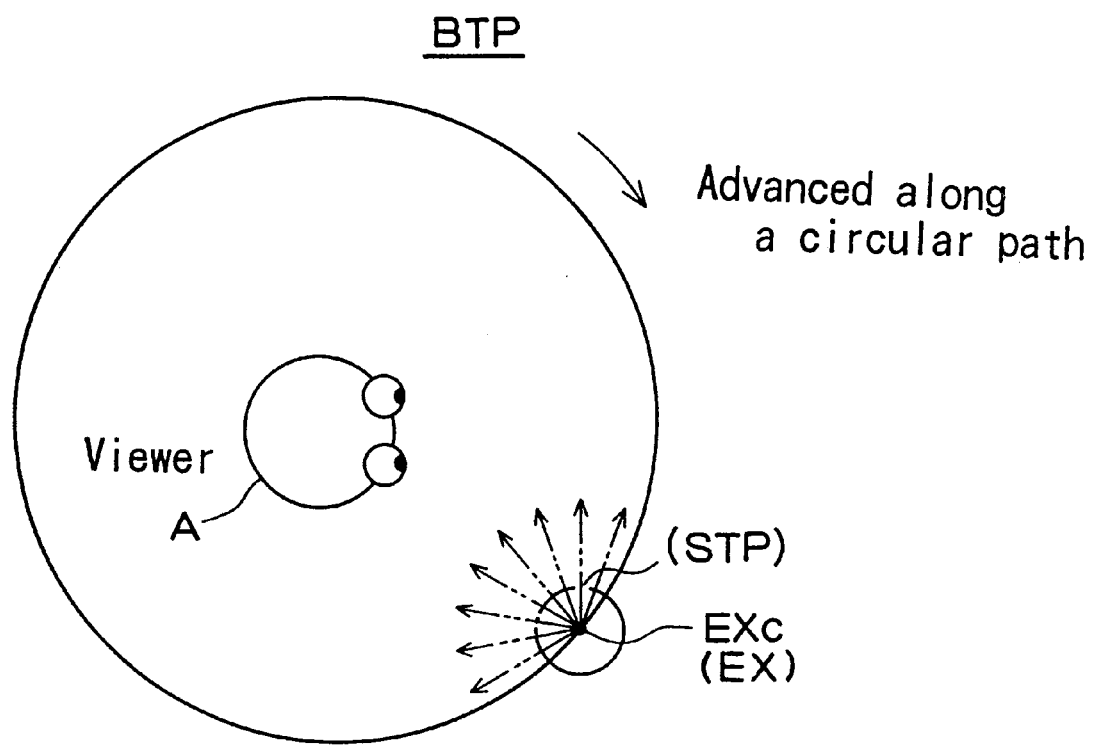
FIG. 11 is a view showing how the images are displayed in the booth.

FIG. 11 is a plan view showing the details of one of vertical lines EXc of which the full-color LED matrixes EX (FIG. 3) consist.

A head position detector DP mounted on the head of the person A transmits a signal S1 in accordance with the position and posture of the person A. On the basis of the signal S1, the positions of the visual points of both of his or her eyes are measured. Consequently, only the images to be afforded to these positions of the visual points of both eyes are displayed on the LED matrixes EX.

Figure 12:
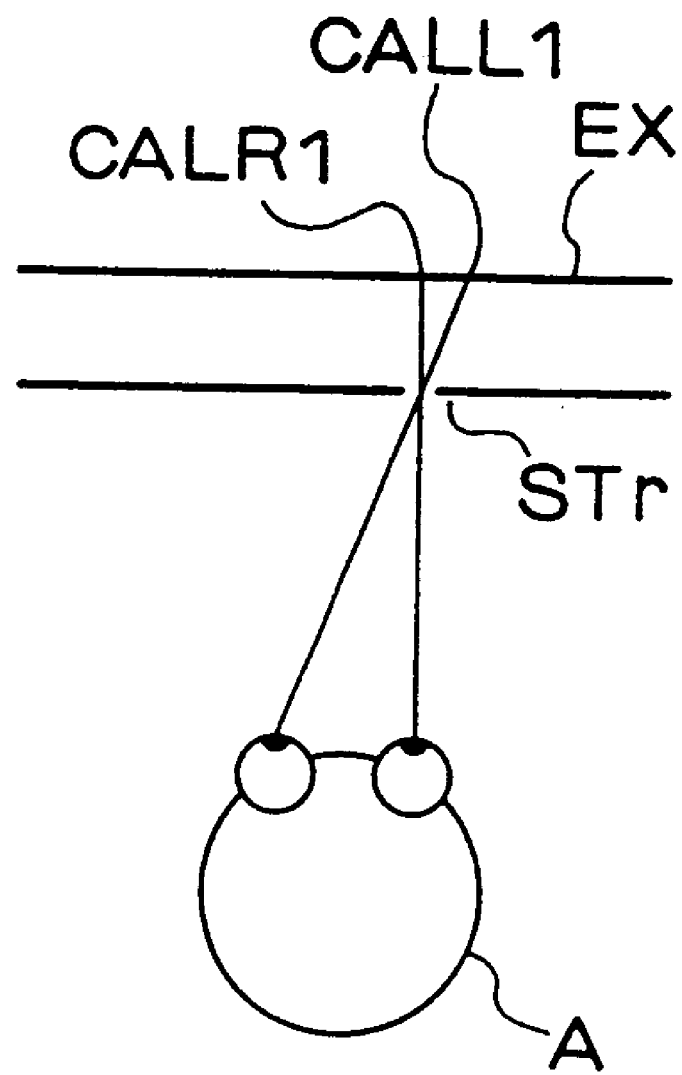
FIG. 12 provides a diagrammatic illustration of an example of how the images for the left and right eyes respectively of an observer are displayed.

FIG. 12 is a view useful in understanding the method of allowing the left and right eyes of the person A to view only the linear images CALL1 and CALR1 respectively. A diaphragm provided with a plurality of vertically extending slit apertures STr, only one of which is shown in FIG. 12, is interposed between the person A and the LED matrix EX.

Figure 13:
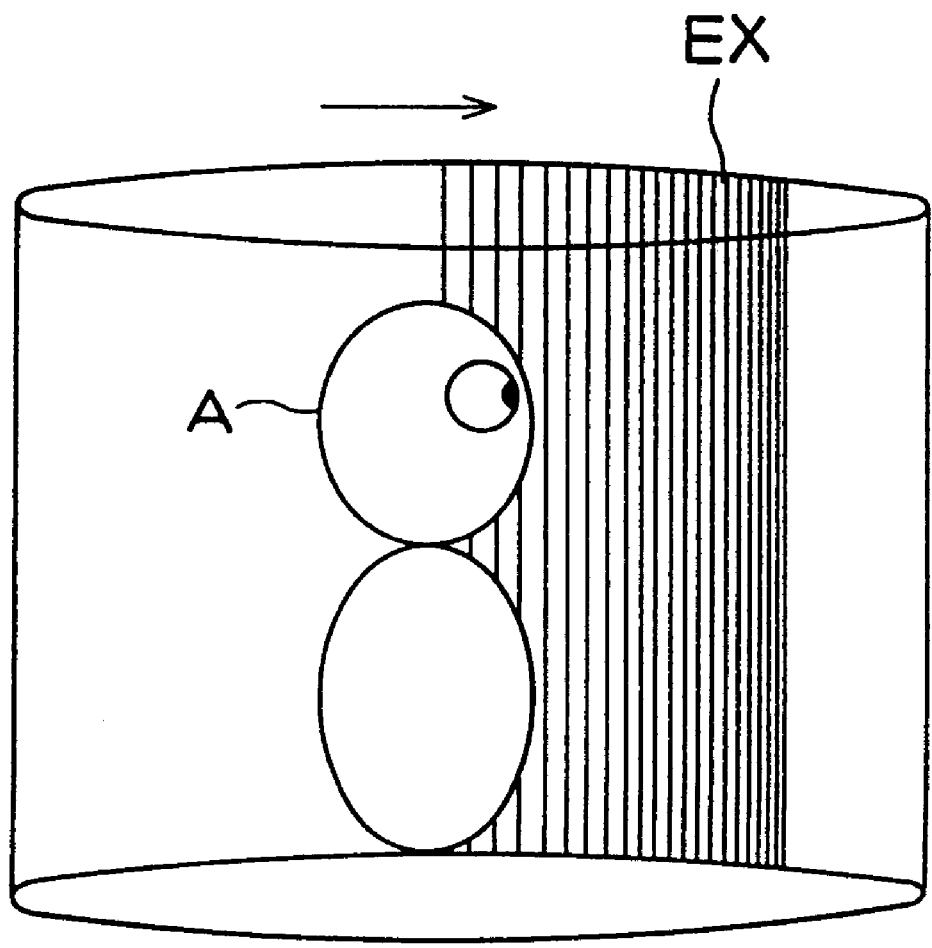
FIG. 13 is a view showing how the observer commands a view of the images when the method shown in FIG. 12 is employed.

The diaphragm provided with the slit apertures STr is carried along in the revolving movement of the LED matrix EX. As the LED matrix EX revolves, the linear images CALL1 and CALR1 displayed thereon change so as to allow the person A to view a three-dimensional image as shown in FIG. 13.

Referring again to FIG. 11, a cylindrical housing or jacket is disposed circumferentially around each vertical line EXc in case of a cylindrical booth BTP intended for the person A who dislikes to put on the head position detector DP. The cylindrical housing or jacket is provided with a slit aperture STP extending longitudinally along a generatrix, by virtue of which the light beams emitted from each vertical line EXc are made highly directional. The cylindrical housing or jacket rotates on its own axis while being advanced along a circular path of travel in the revolving movement of the LED matrix EX.

Thus, one cylindrical booth BTP makes it possible to reproduce all the light beams picked up by the cameras CM (FIG. 3) or the CCD line sensors CL (FIG. 7) of another cylindrical booth BTP so as to afford images to a person in the aforesaid one cylindrical booth BTP from any direction and in any position along the circular path of travel of the LED matrix EX.

If the person B in the cylindrical booth BTB is to be allowed to have a stereoscopic vision without putting on an HMD, a large quantity of information will be required for affording images to him or her from any direction and in any position along the circular path of travel of the LED matrix EX.

Figure 14A:
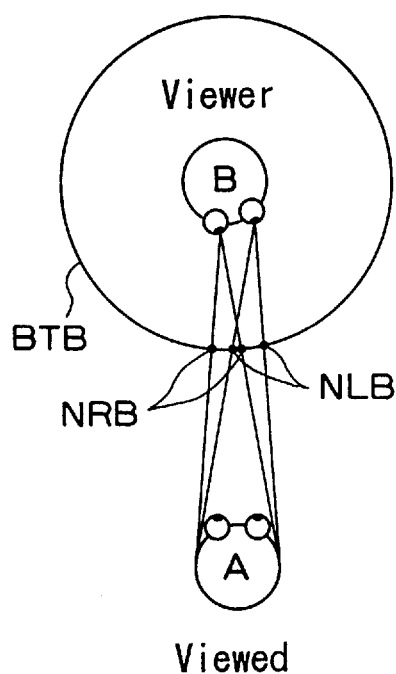
FIGS. 14A and 14B are views to help explain how the scanning lines are selected at the time when the images are displayed.

FIG. 14A is illustrative of directions from which an image of the person A formed by scanning lines selected in the manner shown in FIG. 9A is to be afforded to the person B in the cylindrical booth BTB, as well as positions along the circular path of travel of the LED matrixes EX in which the aforesaid image is to be afforded.

In order to allow the person B to have a stereoscopic vision of the person A, images for the left and right eyes respectively of the person B have to be afforded. The image for the left eye of the person B should be disposed between two points NLB in order to allow that eye to cover the exposed face of the person A. The image for the right eye of the person B should be disposed between two points NRB in order to allow that eye to cover the exposed face of the person A.

Figure 14B:
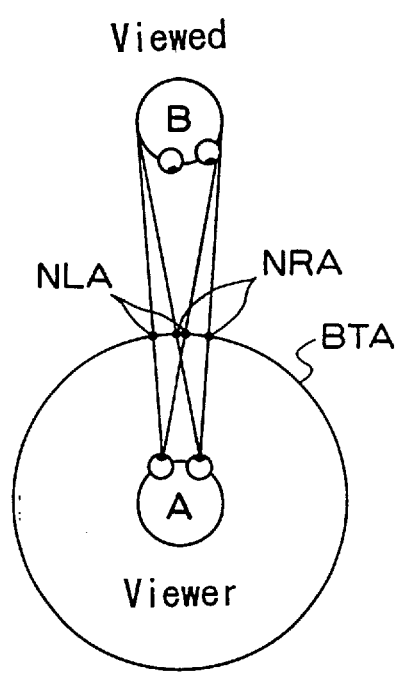

FIG. 14B is illustrative of directions from which an image of the person B formed by scanning lines selected in the manner shown in FIG. 9B is to be afforded to the person A in the cylindrical booth BTA, as well as positions along the circular path of travel of the LED matrixes EX in which the aforesaid image is to be afforded.

In order to allow the person A to have a stereoscopic vision of the person B, the image for the left eye of the person A should be disposed between two points NLA in order to allow that eye to cover the exposed face of the person B. The image for the right eye of the person A should be disposed between two points NRA in order to allow that eye to cover the exposed face of the person B.

The foregoing is premised on an assumption that only two persons A and B are present in the virtual space VS1 (FIG. 2). However, It will of course be apparent to those skilled in the art that the video conference system 1 may include three or more cylindrical booths so as to allow three or more persons to attend a video conference. Furthermore, even a virtual object or objects may be allowed to occupy a portion of the virtual space VS1.

Let it be assumed that n persons in n cylindrical booths respectively are present in a virtual space. When one of them is a speaker, he or she is viewed by the remaining (n−1) persons who are listeners. Since it may well be that any of the n persons will become a speaker, there are n(n−1) cases where the foregoing one-to-one relationship between a viewer and the viewed holds good.

Figure 15:
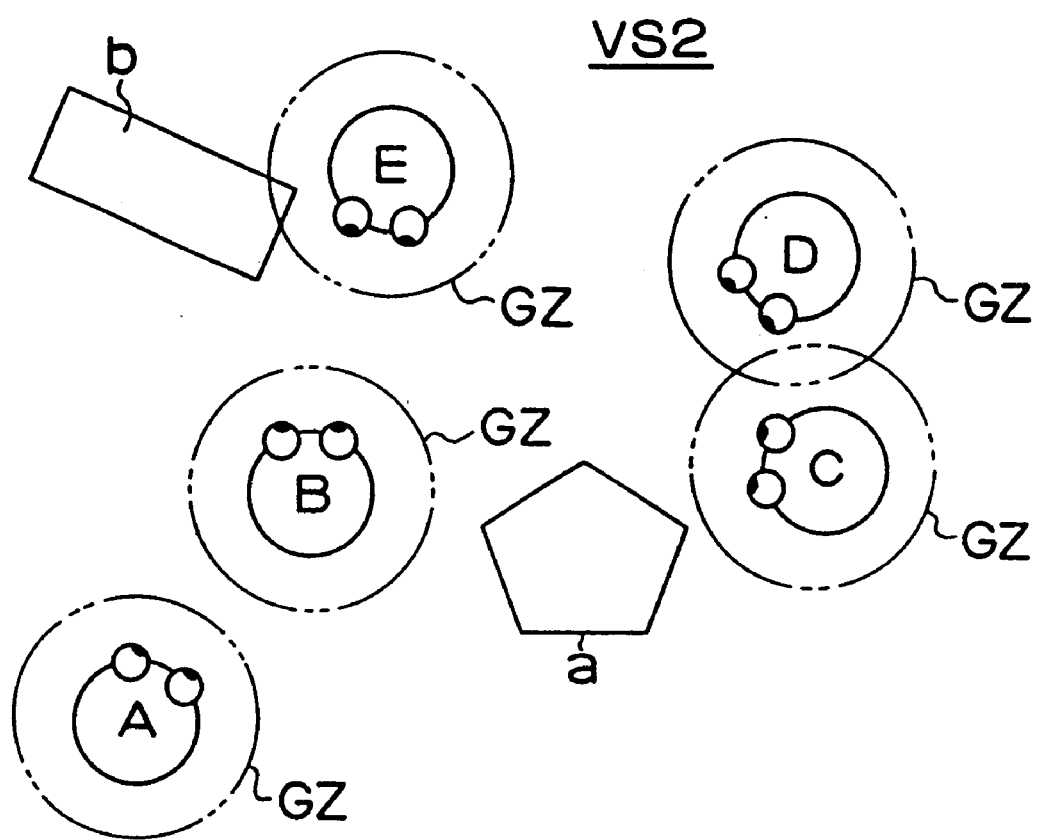
FIG. 15 is a view showing a general state of a virtual space in which five persons and two articles are present.

Five persons A to E present in a virtual space VS2 as shown in FIG. 15 corresponds to a case where the aforesaid n assumes a value of 5. Therefore, there are 20 cases where the foregoing one-to-one relationship between the viewer and the viewed holds true.

Not only the persons A to E but also virtual objects a and b can be disposed in the virtual space VS2. Since IBR does not give sharply defined shapes to the persons, the following approach to the solution of the problem of positional relationship in the virtual space VS2 between one person and another person as well as between a person and a virtual object seems suitable when a portion of one has to be hidden behind the other:

The position of each person is known as a result of measurement by means of the head position detector DP. On the assumption that each person can be represented by a cylindrical region GZ, the aforesaid positional relationship in the virtual space VS2 is replaced with a positional relationship between one cylindrical region GZ and another as well as between a cylindrical region GZ and a virtual object. Major points of this replacement are outlined in Shinji Uchiyama et al., "Location and Manipulation of Multi-Viewpoint Data without Geometric Model in Virtual Environment," *Proceedings of the Virtual Reality Society of JaPan* Vol. 1, pp. 169–172 (1996).

However, this approach to the solution of the problem has the disadvantage that one cannot get a faithful replica of the persons and the virtual object when, as shown in FIG. 15, a portion of the cylindrical region GZ representing the person C overlaps a portion of the cylindrical region GZ representing the person D and when a portion of the virtual object b overlaps a portion of the cylindrical region GZ representing the person E.

With respect to the case where a portion of the cylindrical region GZ representing the person C overlaps a portion of the cylindrical region GZ representing the person D, it can be pointed out that the attendance at a video conference need not be arranged so closely adjacent one another on the screen of a display unit, nor are they actually standing so closely adjacent one another. In order to display a virtual object positioned in close proximity to a person, there has been a prior proposal to use an objective-oriented presentation device such as the commercially available Media[3]. Such a prior proposal is outlined in Masahiko Inami et al., "Virtual Hologram: proposal for the object oriented display," *Proceedings of the Virtual Reality Society of JaPan* Vol. 1, pp. 139–142 (1990).

The horizontal sectional area of each cylindrical region GZ need not be equal to, but may be smaller than, that of the cylindrical booth BTA, BTB, BTm or BTP. The smaller horizontal sectional area of each cylindrical region GZ permits a more faithful replica of the persons and the virtual object to be obtained.

Instead of mechanical scanning carried out by means of a cylindrical housing or jacket disposed circumferentially around the CCD line sensor CL and provided with a slit aperture STm in the embodiment described, it is also possible to use electronic scanning means.

Figure 16:
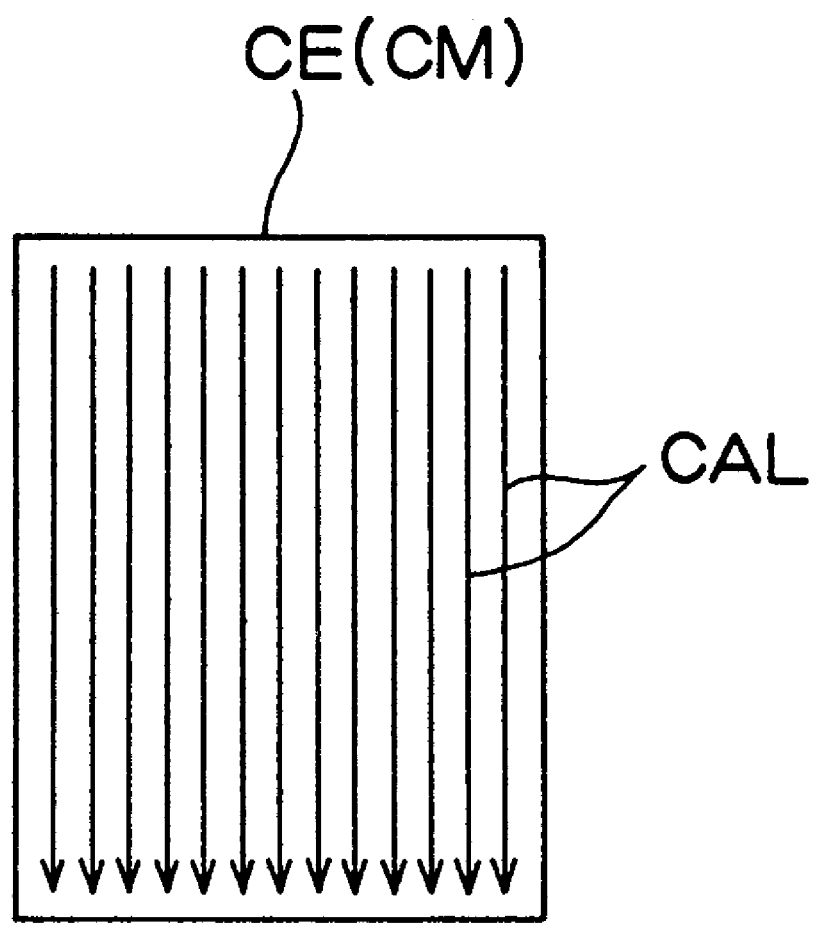
FIG. 16 is a view showing how the linear images corresponding to the aforesaid scanning lines are detected by means of a camera incorporating an area sensor.

FIG. 16 is a view showing how vertical scan effected by means of the camera CM incorporating an area sensor CE consisting of a two-dimensional CCD makes it possible to obtain a large number of scanning lines (i.e. linear images) CAL. Vertical scan is associated with auxiliary scanning effected in a horizontal direction. When necessary scanning lines CAL specified by directions are to be selected from among the aforesaid large number of scanning lines, selection is effected by specifying serial numbers given to the scanning lines CAL in the auxiliary scanning direction. The selected scanning lines CAL correspond to specific light beams picked up by the satellitic mechanism.

Figure 17:
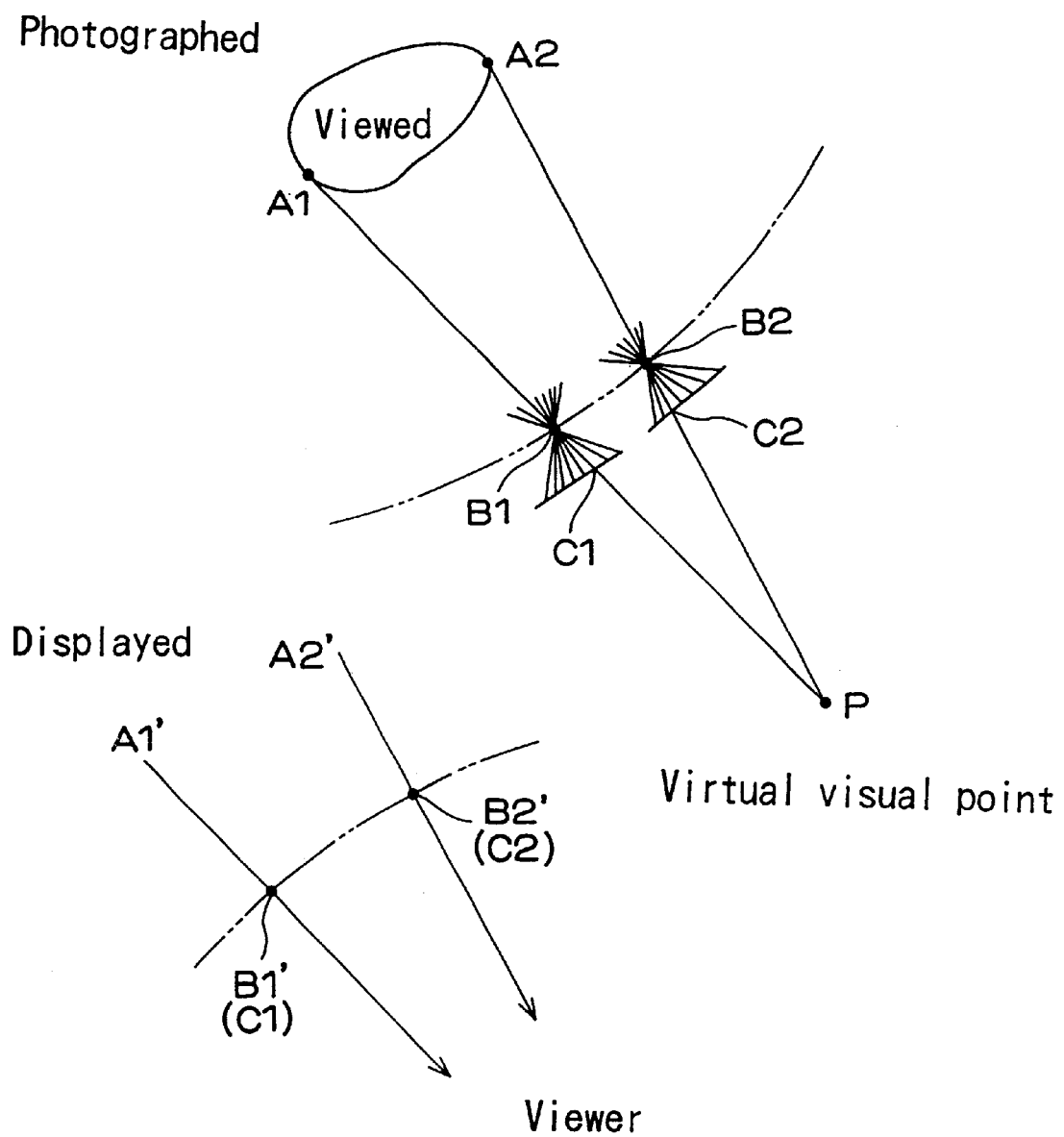
FIG. 17 is a view to help explain how the image pickup and display are effected by the first embodiment of the invention.

As shown in FIG. 17, a light beam directed toward a virtual visual point P from a point Al disposed on the surface of an object to be photographed (such as the person A) is received at a point on a scanning line C1 by means of the camera CM disposed in a position B1. Likewise, a light beam directed toward the virtual visual point P from a point A2 disposed on the surface of the object to be photographed is received at a point on a scanning line C2 by means of the camera CM disposed in a position B2. The scanning line C1 is selected when the camera CM is disposed in the position B1. The scanning line C2 is selected when the camera CM is disposed in the position B2.

The process of receiving the light beams and selecting the scanning lines is carried out at all the pixels disposed between the positions B1 and B2 and with respect to all the points on the exposed face of the object.

In order that the images may be displayed, light beams received by the scanning lines C1 and C2 are formed into linear images, which are directed toward an observer from positions B1' and B2' respectively in such a manner as to deceive him or her into thinking that these linear images are being displayed in positions A1' and A2' respectively. The process of displaying the images is carried out at all the pixels disposed between the positions B1' and B2'.

In order to obtain an image pickup signal from each light beam, a picture signal corresponding to each scanning line CAL is taken out of the area sensor CE. The image pickup signal can be easily taken out of each scanning line CAL in real time by using off-the-shelf hardware. Means for taking the image pickup signal out of each scanning line CAL is hereinafter referred to as "scanning means".

Although a person has a vertically elongated figure, he or she can be photographed to the very limit of a field angle if each camera CM is set in such a manner that the longer sides of its rectangular frame are allowed to stand upright.

It will be appreciated that the desired high resolution may be obtained with a small number of cameras advanced along a circular path of travel. This important facet of the invention obviates the necessity of a large number of cameras arranged around a person and fixedly held in position.

Figure 18:
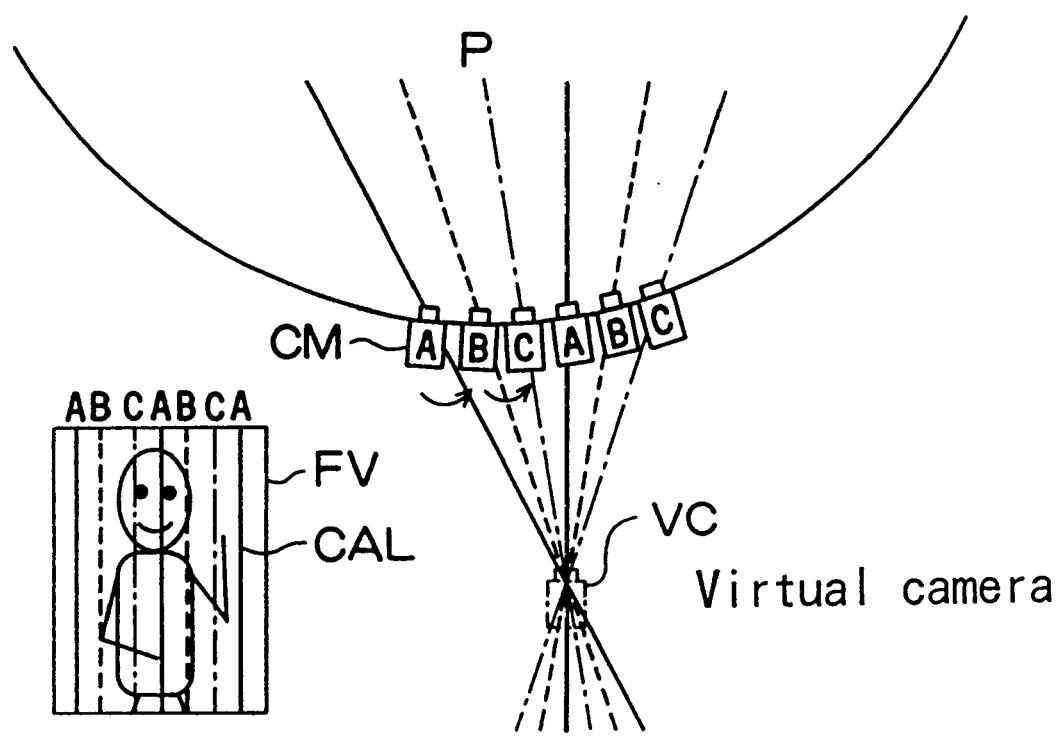
FIG. 18 is a diagram for the principle of interlaced display.

Let it be assumed that a small number of cameras CM having electronic shutters adapted to be released synchronously with each other are advanced along a circular path of travel in a direction as indicated by arrows in FIG. 18, in which only one of these cameras CM is shown as having an electronic shutter released in a plurality of positions A, B, C, A, B, C, etc. When the shutter is released in the first position A, only a linear image corresponding to the position A is updated in an image FV in a virtual camera VC. When the shutter is released in the second and third positions B and C, only the linear images corresponding to the positions B and C are updated in the image FV. Thereafter, the updating of the linear images corresponding to the succeeding positions A, B and C is repeated.

Among the advantages resulting from the aforesaid updating of the linear images is that spatial resolution obtainable with the cameras CM is three times as high as spatial resolution obtainable with cameras fixedly held in position. On the other hand, temporal resolution decreases to one-third so far as a single linear image is concerned. However, the flicker or awkwardness of the final image is held down to the minimum, because one-third of the whole of the final image is changed at an intrinsic image updating rate.

Figure 19:
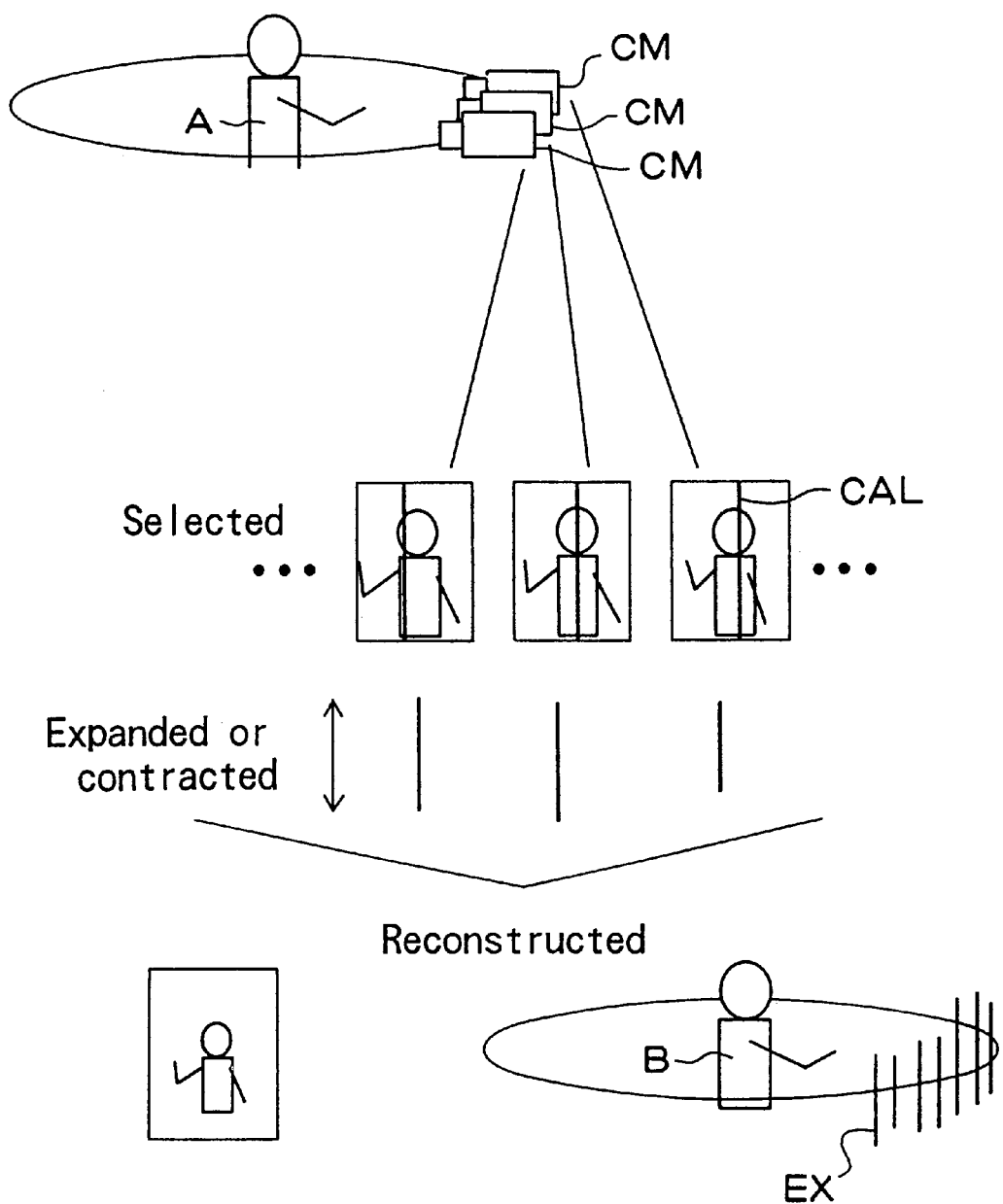
FIG. 19 is a view to help explain how an image is formed by the first embodiment of the invention.

The operation of the video conference system 1 is illustrated diagrammatically in FIG. 19. The person A is photographed by means of the cameras CM which are being advanced along a circular path of travel. From among a large number of scanning lines (i.e. linear images) CAL obtained from this photographing, scanning lines matching with the visual point of the person B are selected, expanded or contracted in accordance with the position of the visual point, and displayed on the LED matrixes EX which are also being advanced along a circular path of travel.

Figure 20:
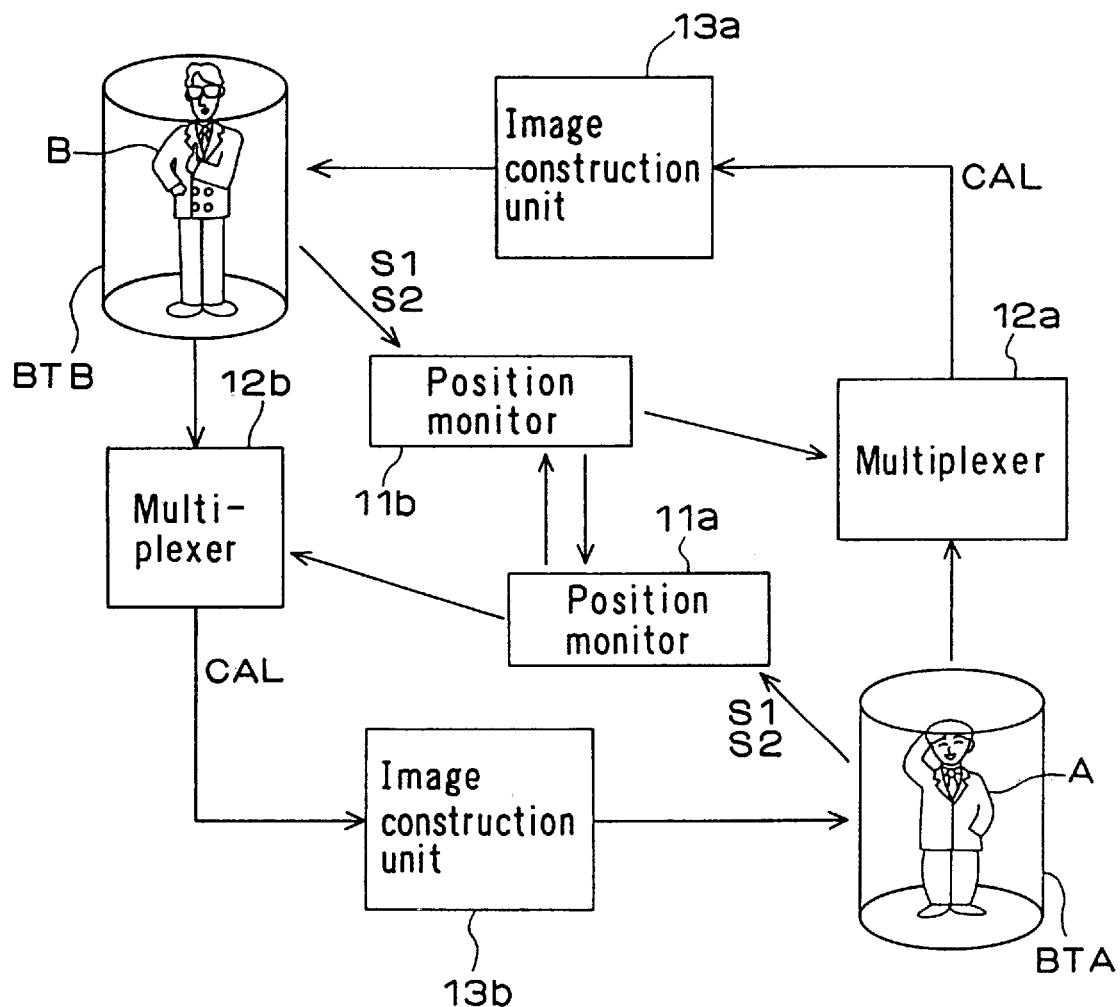
FIG. 20 is a block diagrammatic representation of a video conference system which is the second embodiment of the invention.

Referring now to FIG. 20, another video conference system 1a is shown having substantially the same component parts as the video conference system 1 shown in FIG. 1 except that the former includes position monitors 11a and 11b which are downsized modifications of the host computer 11 included in the latter.

Information on the absolute positions of the persons A and B in the virtual space VS1 is stored in the position monitors 11a and 11b respectively. The information is updated every time the virtual movement of the persons A and/or B in the virtual space VS1 is caused by the treadmill CT or the control stick. An exchange of information is made between the position monitors 11a and 11b, in which the relative coordinates of the persons B and A are calculated on the basis of information obtained. These relative coordinates are supplied from the position monitors 11a and 11b to the multiplexers 12b and 12a respectively, in which linear images CAL needed by the persons B and A are selected on the basis of these relative coordinates.

Figure 21:
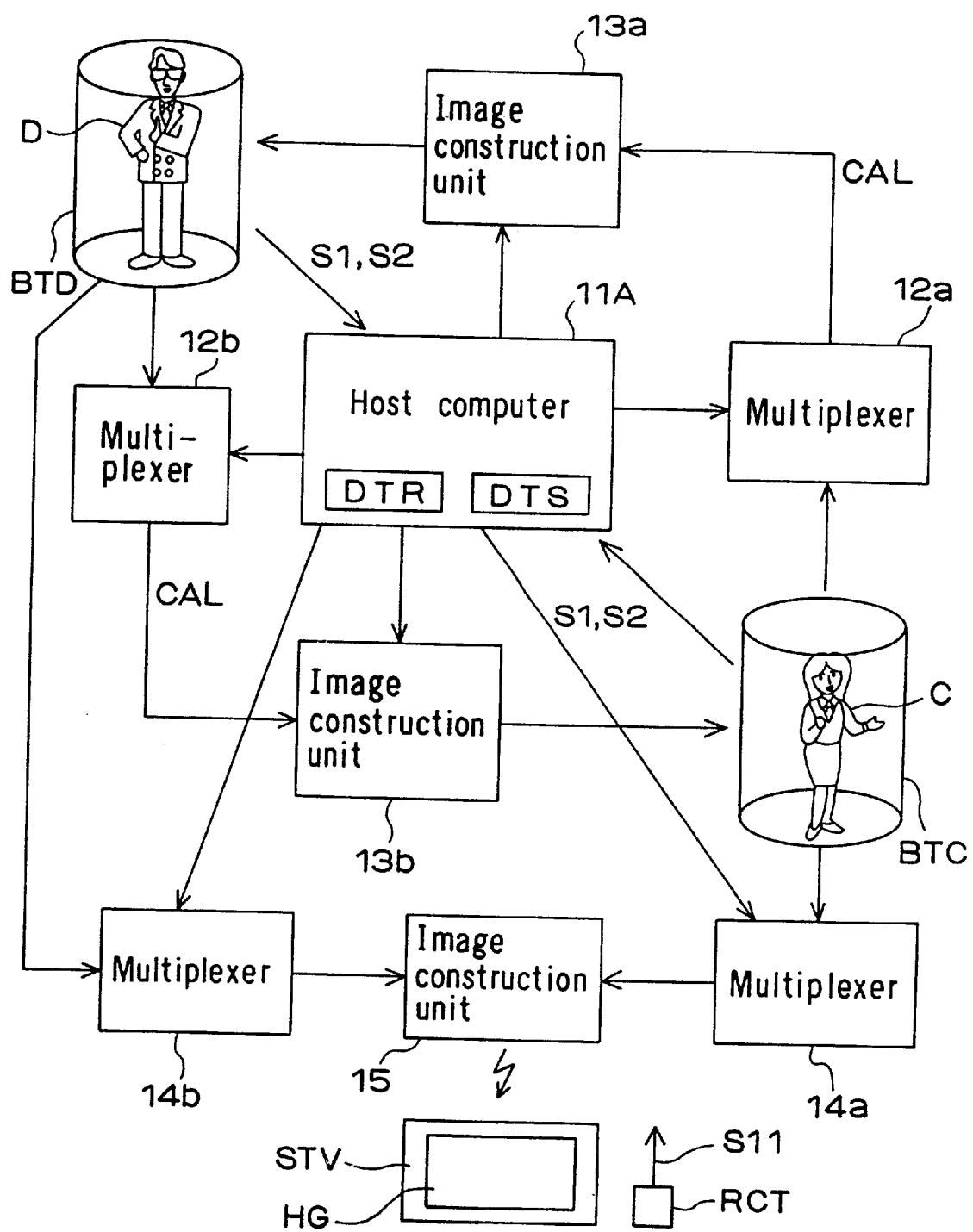
FIG. 21 is a block diagrammatic representation of a three-dimensional interactive television (TV) embodying this invention.
Figure 22:
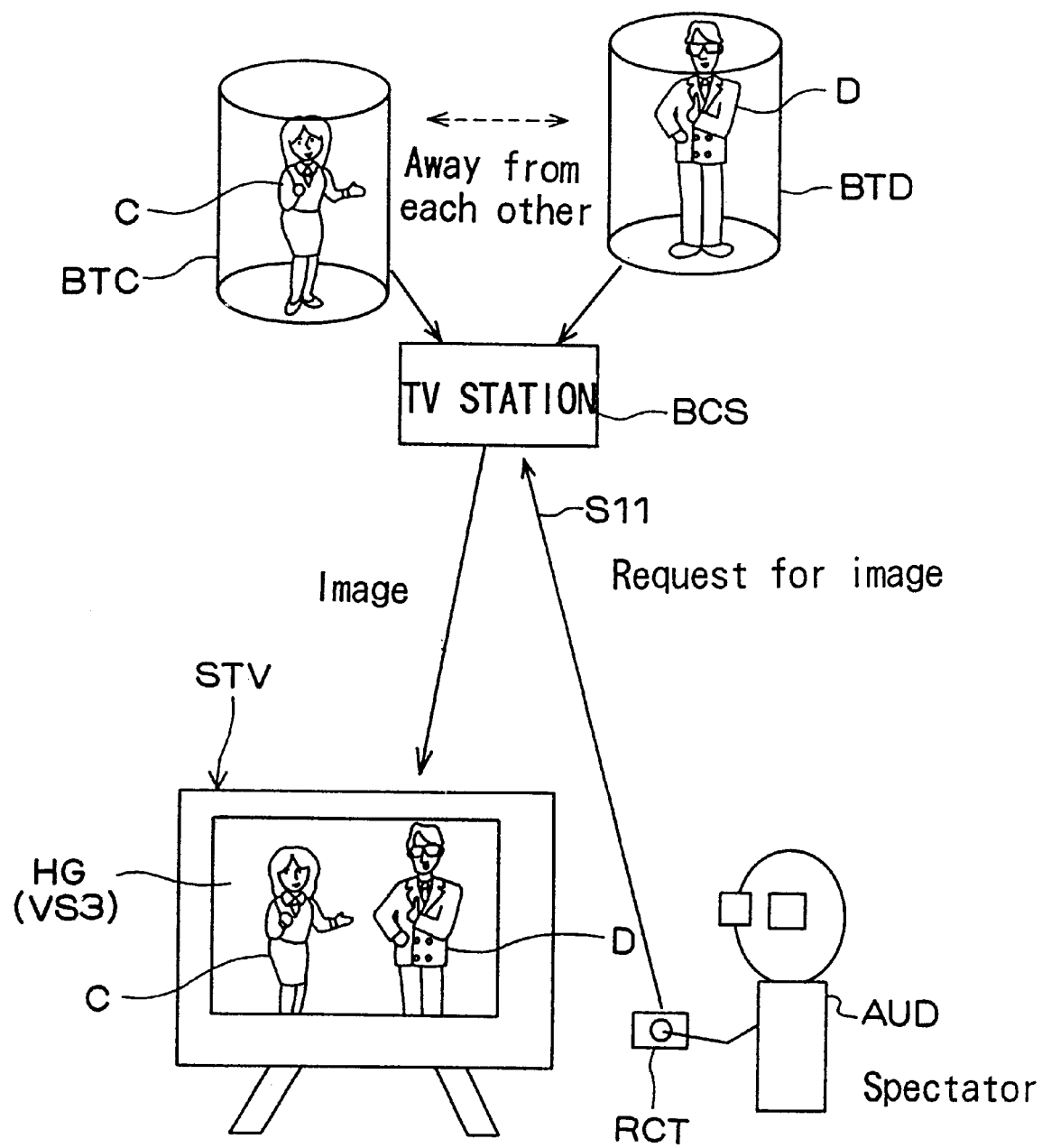
FIG. 22 is a diagram for the principle of the three-dimensional interactive TV.
Figure 23:
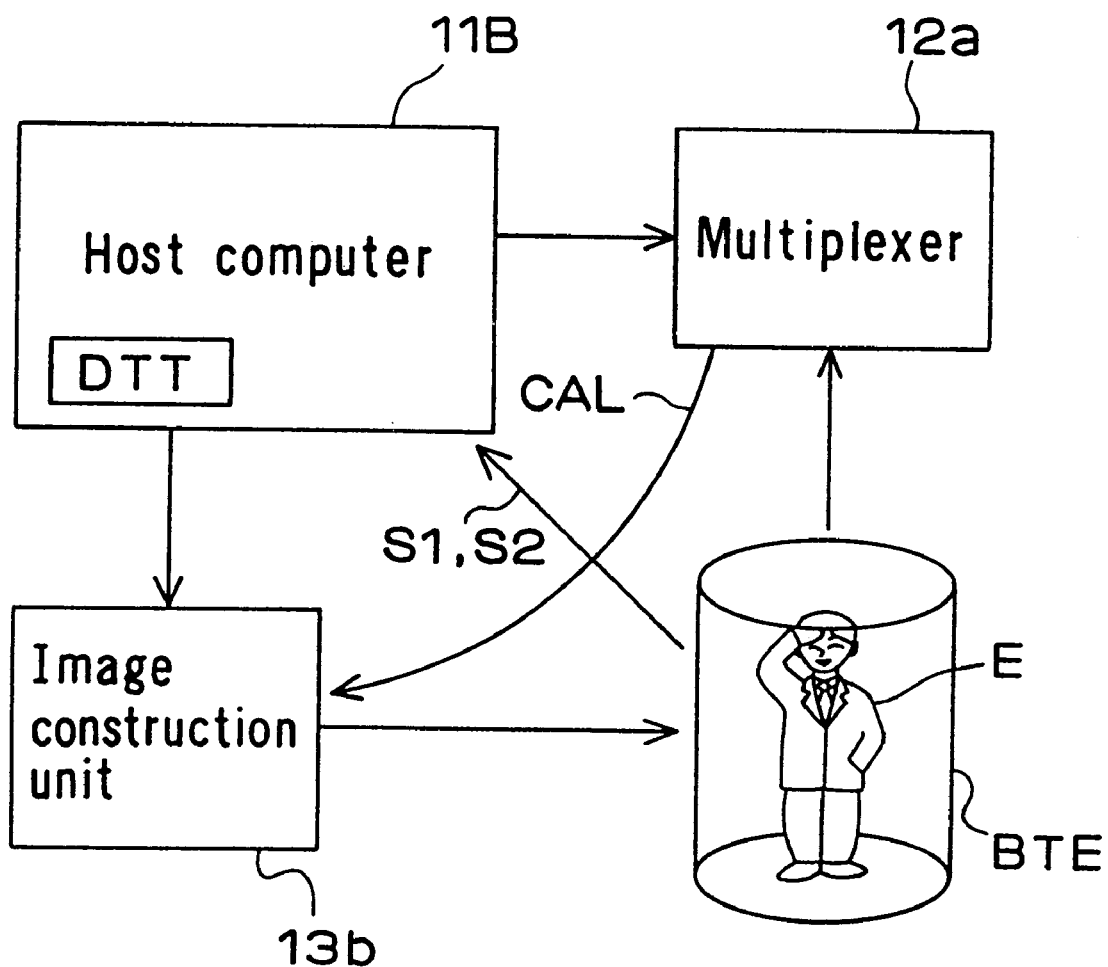
FIG. 23 is a block diagrammatic representation of an apparatus for allowing a person to see an image of him- or herself.

As will be seen by reference to FIGS. 21 to 23, it is possible to provide a further modified video conference system.

A three-dimensional interactive TV 2 shown in FIG. 21 is intended for making a video conference open to spectators and includes a TV receiver STV having a screen HG on which a virtual space VS3 (FIG. 22) is displayed. In order to provide final images to be displayed on the screen HG, the three-dimensional interactive TV 2 further includes multiplexers 14a, 14b and an image construction unit 15.

The three-dimensional interactive TV 2 is substantially similar to the video conference system 1 in that two cylindrical booths BTC and BTD are disposed in different localities and assigned to two persons C and D, and differs therefrom in that the two persons C and D appear on the screen HG to co-exist in the virtual space VS3, feeling as if they were close by each other.

Referring now to FIG. 22, each spectator AUD is exempt from being confined to a cylindrical booth. The visual point of each spectator AUD viewing the persons C and/or D may be changed at will be entering appropriate commands via a controller RCT. A host computer 11A stores information DTS on the visual point of each spectator AUD. The controller RCT can be used for transmitting a signal S11 to a TV station BCS for the purpose of making a request for an image corresponding to a visual point selected by each spectator AUD.

Images received from the TV station BCS are stereoscopically displayed on the screen HG of the TV receiver STV by various methods well known in the art as conventional. For example, each spectator AUD is requested to put on glasses provided with liquid crystal shutters. Images for his or her left and right eyes are alternately displayed on the screen HG of the TV receiver STV. A switchover of each liquid crystal shutter from non-conducting to conducting state and vice versa is made every time a switchover from an image for the left eye to an image for the right eye and vice versa is made on the screen HG of the TV receiver STV. According to another known method of stereoscopically displaying the images, a lenticular screen is mounted on the screen HG. Images for the left and right eyes are compressed in the direction between the two edges of, i.e. transverse to, each lenslet of the lenticular screen to such an extent that each image is as narrow as each lenslet.

The three-dimensional interactive TV 2 permits a plurality of spectators AUD to make request for images corresponding to their favorite visual points irrespective of the number of persons appearing on the screen HG and irrespective as to whether or not there is a background image.

FIG. 23 is a block diagrammatic representation of an apparatus 3 for allowing a person E to see an image of him- or herself from any virtual visual point in a cylindrical booth BTE. A host computer 11B stores information DTT on the positional relationship between the person E as a viewer and the person E as the viewed.

In order to allow the person E to see an image of him- or herself, the linear images CAL of the person E are picked up and delivered to the cylindrical booth BTE, which provides final images and displays the same. The voices of the person E, together with sounds produced around the person E, are also recorded and delivered to the cylindrical booth BTE, in which these voices and sounds are reproduced by means of a stereophonic sound system.

While each camera CM and each LED matrix EX have been described as being advanced along the whole of the circular path of travel, it will be apparent that they may be advanced only along a portion of the circular path of travel, e.g., along a semicircular or trisected portion in front of the person.

Instead of the CCD line sensor CL or the CCD area sensor CE used in the embodiments described, it is also possible to use other image pickup devices. Instead of the LED matrixes EX, it is also possible to use other display devices. Changes in the construction, shape and dimensions of the cylindrical booths BTA and BTB, as well as in the construction, data processing system design and operating procedures for the video conference system 1, three-dimensional interactive TV 2 and apparatus 3, may be made without departing from the nature and principle of the invention.

What is claimed is:

1. A method of producing images in a virtual space, comprising the steps of:

detecting light beams directed toward virtual visual points from among light beams emitted from or reflected on a surface of an object, said detection being effected by an image pickup device in a plurality of positions lying on a virtual closed surface with which said object is enclosed, wherein said virtual visual points are not lying on said virtual closed surface;

converting said detected light beams into image pickup signals;

delivering said image pickup signals to a display device adapted to display an image toward a visual point of an observer in a place different from a place where any of said virtual visual points is disposed; and displaying said image on a basis of said image pickup signals in such a manner as if light beams were emitted toward said visual point of said observer from various points on a surface of a virtual object disposed in a virtual position corresponding to the relative positions of said object and any of said virtual visual points.

2. An apparatus for producing images in a virtual space, comprising:

an image pickup device for detecting light beams directed toward a plurality of virtual visual points from among light beams emitted from or reflected on a surface of an object, said detection being effected in a plurality of positions lying on a virtual closed surface with which said object is enclosed, wherein said virtual visual points are not lying on said virtual closed surface, said thus detected light beams being converted into image pickup signals;

a display device for reproducing said detected light beams on a basis of said image pickup signals and displaying an image in such a manner as if light beams were emitted toward a visual point of an observer from various points on a surface of a virtual object; and a transmitting device for transmitting said image pickup signals to said display device at real-time rates.

3. An apparatus as defined in claim 2, wherein:

said image pickup device detects said detected light beams received from a plurality of directions, and said display device reproduces said detected light beams in virtual directions corresponding to directions from which said detected light beams have been received by said image pickup device.

4. An apparatus as defined in claim 2, wherein said detected light beams directed toward each of said virtual visual points are detected when said detected light beams are received by said image pickup device from a direction perpendicular to a line connecting both eyes of said observer.

5. An apparatus as defined in claim 3, wherein said image pickup device comprises:

an image pickup element; and a housing or jacket disposed around said image pickup element and provided with a slit aperture, said housing or jacket together with said image pickup element being adapted to rotate on its own axis.

6. An apparatus as defined in claim 3, wherein said display device comprises:

a display element; and a housing or jacket disposed around said display element and provided with a slit aperture, said housing or jacket together with said display element being adapted to rotate on its own axis.

7. An apparatus as defined in claim 3, wherein said image pickup device includes a CCD camera adapted to obtain a plurality of substantially vertically extending scanning lines.

8. An apparatus as defined in claim 7, wherein each of said image pickup signals corresponds to a respective each of said scanning lines, said image pickup signals being transferred one by one from said image pickup device to said display device.

9. An apparatus for producing images in a virtual space, comprising:

a first image pickup device for detecting first light beams directed toward a first virtual visual point from among light beams emitted from or reflected on a surface of a first object, said detection being effected in a plurality of positions lying on a first virtual closed surface with which said first object is enclosed, wherein said first virtual visual point is not lying on said first virtual closed surface, said thus first detected light beams being converted into first image pickup signals;

a second image pickup device for detecting second light beams directed toward a second virtual visual point from among light beams emitted from or reflected on a surface of a second object, said detection being effected in a plurality of positions lying on a second virtual closed surface with-which said second object is enclosed, wherein said second virtual visual point is not lying on said second virtual closed surface, said thus second detected light beams being converted into second image pickup signals;

a second display device for reproducing said first detected light beams on a basis of said first image pickup signals and displaying an image of said first object in such a manner as if light beams were emitted from various points on said surface of said first object toward a visual point of said second object who is viewing said image of said first object;

a first display device for reproducing said second detected light beams on a basis of said second image pickup signals and displaying an image of said second object in such a manner as if light beams were emitted from various points on said surface of said second object toward a visual point of said first object who is viewing said image of said second object; and a transmitting device for transmitting said first and second image pickup signals to said second and first display devices respectively at real-time rates.

10. An apparatus as defined in claim 9, wherein:

said first display device is adapted to display a specific background color when said first image pickup device detects said first light beams, and said second display device is adapted to display another specific background color when said second image pickup device detects said second light beams.

11. An apparatus as defined in claim 9, further comprising:

a first booth adapted to confine said first object thereto and provided with said first image pickup device and said first display device; and a second booth adapted to confine said second object thereto and provided with said second image pickup device and said second display device.

12. An apparatus as defined in claim 11, further comprising:
   a first input device for accepting positional information on said first object in said first booth; and
   a second input device for accepting positional information on said second object in said second booth.

13. An image pickup system for detecting light beams directed toward a plurality of virtual visual points from among light beams emitted from or reflected on a surface of an object, said detection being effected in a plurality of positions lying on a virtual closed surface with which said object is enclosed, said thus detected light beams being converted into image pickup signals, said image pickup system comprising:
   an area sensor;
   an image pickup device consisting of a scanner for scanning said area sensor in a direction perpendicular to a line connecting both eyes of an observer, detecting only light beams that correspond to scanning lines obtained from said scanning, and converting said detected light beams into image pickup signals; and
   a moving device for moving said image pickup device along said virtual closed surface,
   wherein a visual point of said observer corresponds to one of said virtual visual-points and wherein said virtual visual points are not lying on said virtual closed surface.

14. An image pickup system as defined in claim 13, further comprising a multiplexer for selecting only image pickup signals that correspond to light beams directed toward said virtual visual points, said selection being effected from among said image pickup signals converted from said detected light beams.

* * * * *

UNITED STATES PATENT AND TRADEMARK OFFICE
CERTIFICATE OF CORRECTION

PATENT NO.   : 6,836,286 B1
DATED        : December 28, 2004
INVENTOR(S)  : Susumu Tachi et al.

It is certified that error appears in the above-identified patent and that said Letters Patent is hereby corrected as shown below:

Drawing,
Sheet 7, Figure 7, please delete Figure 7 and add new Figure 7 below.

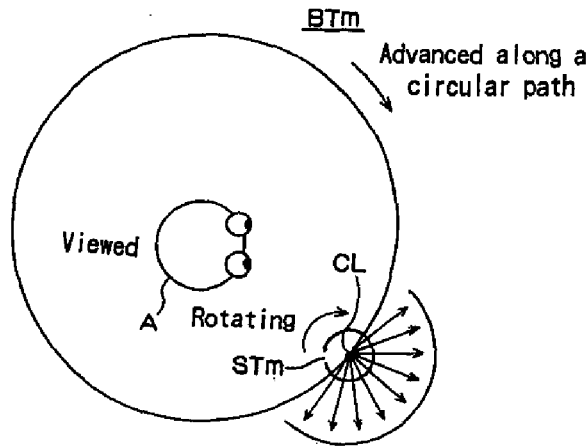

Sheet 9, Figures 9A and 9B, please delete Figures 9A and 9B and add new Figures 9A and 9B below.

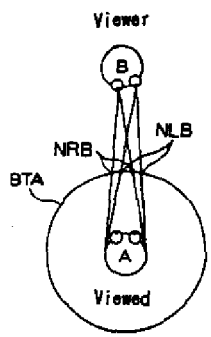
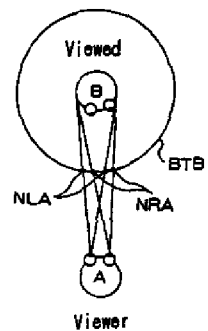

UNITED STATES PATENT AND TRADEMARK OFFICE
CERTIFICATE OF CORRECTION

PATENT NO. : 6,836,286 B1
DATED : December 28, 2004
INVENTOR(S) : Susumu Tachi et al.

It is certified that error appears in the above-identified patent and that said Letters Patent is hereby corrected as shown below:

Column 4,
Line 18, delete "of both of both of his or her" and insert -- of both of his or her --.

Column 14,
Line 30, delete "with-which" and insert -- with which --.

Column 16,
Line 7, delete "visual-points" and insert -- visual points --.

Signed and Sealed this

Third Day of May, 2005

JON W. DUDAS
*Director of the United States Patent and Trademark Office*